(12) United States Patent
Ishii et al.

(10) Patent No.: US 7,165,320 B2
(45) Date of Patent: Jan. 23, 2007

(54) APPARATUS FOR MANUFACTURING FILM CARTRIDGE AND FOR FEEDING PLATE MATERIAL

(75) Inventors: Masahiro Ishii, Kanagawa (JP); Akihiko Hase, Kanagawa (JP); Chiaki Suzuki, Kanagawa (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/193,331

(22) Filed: Aug. 1, 2005

(65) Prior Publication Data

US 2006/0168801 A1 Aug. 3, 2006

Related U.S. Application Data

(62) Division of application No. 10/387,323, filed on Mar. 13, 2003, now Pat. No. 6,948,237.

(30) Foreign Application Priority Data

| | | |
|---|---|---|
| Mar. 15, 2002 | (JP) | ............... 2002-072255 |
| Mar. 15, 2002 | (JP) | ............... 2002-072256 |
| May 7, 2002 | (JP) | ............... 2002-131606 |

(51) Int. Cl.
  *B23P 19/00* (2006.01)
  *G03B 1/04* (2006.01)
(52) U.S. Cl. .................... 29/806; 232/324
(58) Field of Classification Search ............ 29/806, 29/428, 469, 559, 719, 743; 242/324, 348.4, 242/348, 335
See application file for complete search history.

(56) References Cited

U.S. PATENT DOCUMENTS

| | | | | |
|---|---|---|---|---|
| 6,159,839 A | * | 12/2000 | Jeng et al. | ............... 438/618 |
| 6,694,607 B2 | * | 2/2004 | Suzuki et al. | ............... 29/806 |
| 2003/0210978 A1 | | 11/2003 | Smets et al. | |

FOREIGN PATENT DOCUMENTS

| | | |
|---|---|---|
| JP | 63-199035 | 8/1988 |
| JP | 1-287670 | 11/1989 |
| JP | 4-102844 | 4/1992 |
| JP | 406160292 | 6/1994 |
| JP | 10-203636 A | 8/1998 |

* cited by examiner

*Primary Examiner*—John C. Hong
(74) *Attorney, Agent, or Firm*—Sughrue Mion, PLLC

(57) ABSTRACT

A film cartridge assembling apparatus including one or more assembly chucks each including two die elements formed by combining partial cylindrical inner surfaces thereof together. The circumference of a resulting cylinder being partially cut to form an opening. One of the die elements includes a member having a flat surface extending from an end of the cylindrically-shaped inner surface towards the opening. The member is adjustably mounted to the one of the die elements. The assembly chuck is able to assume a closed state in which the two inner surfaces of the two die elements are matched to each other to form a cylindrical inner surface and an opened state in which ends of the two die elements substantially parallel to the center axis of the cylindrical inner surface are spaced apart from each other.

10 Claims, 24 Drawing Sheets

PRIOR ART
FIG. 24 (A)
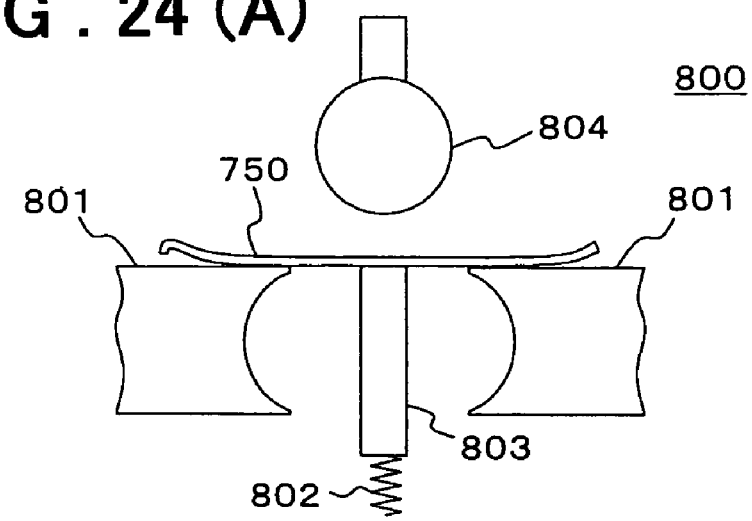
FIG. 24 (B) ⇩
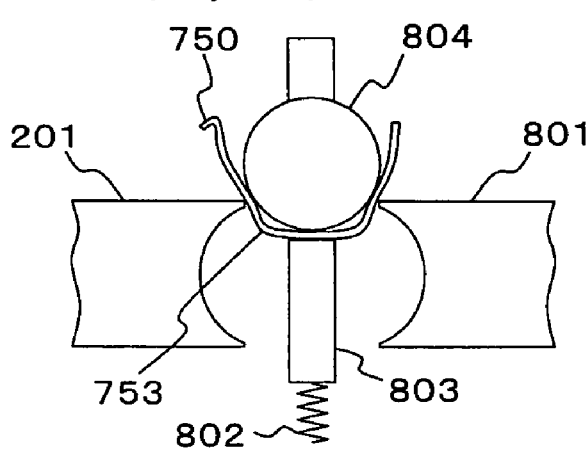
FIG. 24 (C) ⇩
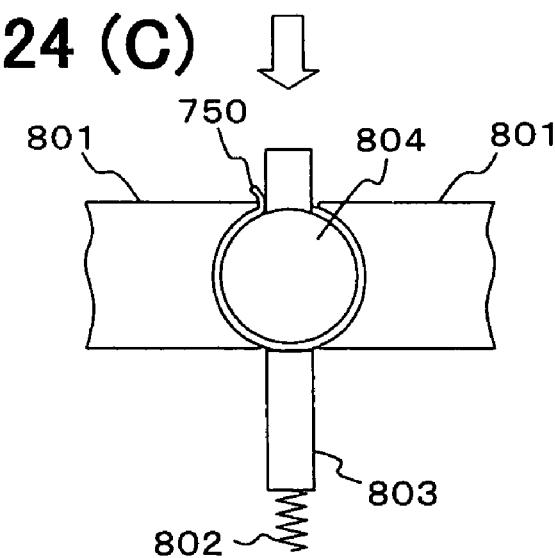

US 7,165,320 B2

APPARATUS FOR MANUFACTURING FILM CARTRIDGE AND FOR FEEDING PLATE MATERIAL

This is a divisional of application Ser. No. 10/387,323 filed Mar. 13, 2003, now U.S. Pat. No. 6,948,237. The entire disclosure of the prior application Ser. No. 10/387,323 is considered part of the disclosure of the accompanying divisional application and is hereby incorporated by reference.

FIELD OF THE INVENTION

In a first aspect, this invention relates to a method and apparatus for manufacturing a film cartridge for holding a photographic roll film therein, and to a method and apparatus for supplying a plate material. More particularly, it relates to a method and apparatus for manufacturing a film cartridge, whereby a high-speed operation until forming a one-capped cartridge may be achieved, and to a method and apparatus for supplying a plate material.

In a second aspect, this invention also relates to an apparatus for assembling a film cartridge comprised of a ribbon plate for holding a photographic roll film therein, and a cap, and to an apparatus for assembling a film cartridge having an assembly chuck for holding the ribbon plate in a rounded state.

In a third aspect, this invention further relates to an apparatus for forming a film cartridge by rounding a ribbon plate of the film cartridge holding a photographic roll film therein.

BACKGROUND OF THE INVENTION

A 35 mm photographic roll film is used in a state in which the film is housed in a film cartridge. This film cartridge is basically made up by a cylindrically-shaped ribbon plate, a spool housed within the ribbon plate, and caps for closing the upper and lower ends of the ribbon plate. On the inner surface of an end of a film pull-out opening of the ribbon plate, there is bonded a velvet ribbon for light shielding.

The method for manufacturing a film cartridge for housing a photographic roll film is now explained. Referring to FIG. 5, for forming the aforementioned ribbon plate for the film cartridge, a metal sheet is cut to a longitudinal size and a transverse size corresponding to the longitudinal size and the transverse size of a developed ribbon plate, forming the so cut metal sheet so that the cross-sectional shape along the long axis of the formed product is in a boat-like shape. To left and right ends of a so formed metal sheet 101 are stuck velvet ribbons 102a, 102b to produce a so-called boat-shaped ribbon plate.

The boat-shaped ribbon plate then is rounded in a cylindrical shape and a cap 103a is clinched to one side end of the rounded ribbon plate to from a so-called "film cartridge opened on its one side end or a one-capped cartridge" (see FIG. 5)

Finally, an assembly comprised of a film of a predetermined length 105 is wound on a spool 104 is inserted from an opening side of the one-capped cartridge, and a cap 103b is clinched to the open side end of the one-capped cartridge to form a so-called [wound film cartridge] which is a film cartridge having a photographic roll film wound thereon (see FIG. 5).

Referring to the drawings, a conventional method and apparatus for manufacturing a film cartridge are now explained.

Referring to FIG. 6, this conventional apparatus 100 includes an index unit 170 rotatable about an rotation axis perpendicular to a substantially horizontal surface and which holds plural assembly chucks 171 at equi-angular intervals about the rotation axis. At preset positions of eight stations, arranged on the circumference of the index unit 170, there are arranged a ribbon plate supplying unit 110, a one-capped cartridge producing unit 120, a inspecting unit 130, a unacceptable product discharging unit 140, an acceptable product discharging unit 150 and a remnant discharging unit 160.

First, the boat-shaped ribbon plate is inserted (supplied) from the ribbon plate supplying unit 110 into an assembly chuck 171 which may be halted in its proximity and which is capable of accepting the ribbon plate (see FIG. 6). As the index unit 170 is run in rotation, the inserted boat-shaped ribbon plate is transported to the one-capped cartridge producing unit 120. In this one-capped cartridge producing unit 120, the boat-shaped ribbon plate is rounded to a cylindrical shape, and a cap, supplied to one end of the rounded ribbon plate, is inserted and subsequently clinched to the ribbon plate to form a one-capped cartridge. As the index unit 170 is run in rotation, the so formed one-capped cartridge is transported to the inspecting unit 130. In this inspecting unit 130, the state of engagement between the cap and the ribbon plate in the one-capped cartridge is monitored to detect whether or not the one-capped cartridge is acceptable. As the index unit 170 is further run in rotation, the one-capped cartridge, detected as described above, is transported to the unacceptable product discharging unit 140. If the one-capped cartridge has been found to be unacceptable in the inspecting unit 130, the unacceptable one-capped cartridge is discharged by the unacceptable product discharging unit 140. If conversely the one-capped cartridge has been found to be acceptable, the one-capped cartridge is not discharged (see FIG. 6). If, as the index unit 170 is further run in rotation, the one-capped cartridge, found as being acceptable, is transported to the acceptable product discharging unit 150, the one-capped cartridge, verified to be acceptable in the inspecting unit 130, is discharged in the acceptable product discharging unit 150 (see FIG. 6). If the index unit 170 further run in rotation, and any product that remained without being discharged by the unacceptable product discharging unit 140 or by the acceptable product discharging unit 150 has been transported to the remnant discharging unit 160, such remnant, present in the assembly chuck in the remnant discharging unit 160, is discharged (see FIG. 6). The index unit 170 is further run in rotation and a boat-shaped ribbon plate is again introduced into the now void assembly chucks 171 to repeat the above-described processing. The operations in the respective process step units are carried out simultaneously such that one one-capped cartridge is completed for each pitch of rotation of the index unit.

The ribbon plate supplying unit is explained in detail. The ribbon plate supplying unit may be sub-divided into a ribbon plate transfer process for transferring a ribbon plate to a stocker (stock unit) from a tray loaded with plural ribbon plates, and a ribbon plate supplying process for supplying the ribbon plates accumulated in the stocker to the index unit.

Referring to FIGS. 7 and 8, a ribbon plate transfer process 201 of the ribbon plate supplying unit includes a tray changer 210, a transfer unit 220 and a stocker 230.

The ribbon plate transfer process 201 delivers a tray 204, on which are loaded plural boat-shaped ribbon plates, aligned in an upstanding position thereon, by the tray changer 210 (see FIG. 7). That is, after lifting the second tray from the bottom of a stack of trays, loaded on a tray pull down unit 211, the lowermost tray 204 is moved on a conveyor to a transfer unit 212 (see FIGS. 7 and 8). The transfer mechanism 220, including a suction magnet, not shown, enclosed therein, and also including gripper 221, for gripping the boat-shaped ribbon plate 203 with claws, not shown, descends onto the tray 204 on the transfer unit 212 to grip together a pre-set number of the boat-shaped ribbon plates 203 placed on the tray 204 in the upstanding position. The transfer mechanism 220 is then uplifted, as it grips the boat-shaped ribbon plates 203, and then is moved horizontally to a position above the stocker 230 (see FIGS. 7 and 8). The bottom surface of the gripper 221 holding the boat-shaped ribbon plates 203 is then tilted, by movement of a rotation mechanism 222, from a horizontal position to the same angle as that of an inclined base 231 of the stocker 230. The boat-shaped ribbon plates 203 are then lowered, in the tilted state, onto the inclined base 231. The gripping of the transfer mechanism 220 is then released. This transfers the set of the boat-shaped ribbon plate 203 in the upstanding and aligned state to the stocker 230 (see FIG. 7). Meanwhile, the tray 204, now emptied, are sent by a conveyor to a tray pile up unit 213. The trays, already existing, are uplifted and the empty tray 204 is inserted in the lowermost tier (see FIGS. 7 and 8).

Referring to FIGS. 9 and 10, the ribbon plate supply process 202 of the ribbon plate supply unit includes a stocker 230, a suction mechanism 240, a magnet 250 and an assembly chuck 171.

In the ribbon plate supply process 202 of the ribbon plate supply unit, the set of the boat-shaped ribbon plate 203, transferred onto the stocker 230, are slid together by a slide mechanism (stacker weight) towards a lower side, as the boat-shaped ribbon plates 203 are aligned in the upstanding orientation on the inclined base 231, until the boat-shaped ribbon plates 203 are retained by claws, not shown, arranged in a outlet 232 (see FIG. 9). At this time, the boat-shaped ribbon plates 203, accumulated in the aligned state on the stocker 230, are progressively transferred from the upstanding aligned orientation to the horizontal orientation as they move from the inclined base 231 to the outlet 232 (see FIG. 9). The boat-shaped ribbon plate 203, lying in the outlet 232 of the stocker 230, are sucked by a suction mechanism 240, which have been lifted by an uplifting mechanism 242, and are there by pulled downwards (see FIG. 9). The boat-shaped ribbon plate 203, thus separated from the succeeding boat-shaped ribbon plates 203, is pushed towards right in the drawing, by a claw 261 provided on an swinging member 260, and is thereby taken out, as the boat-shaped ribbon plate 203 remains in the sucked state (see FIG. 9). A baffle board, not shown, is provided at the outlet 232, to prevent two plates from being taken out simultaneously to enable only one plate to be taken out reliably each time. The boat-shaped ribbon plate 203, thus taken out, is transported in the sucked state to a position below the magnet 250 and is lifted by an uplifting mechanism 242. The sucked state is then released to permit the boat-shaped ribbon plate 203 to be retained by the magnet 250 (see FIGS. 9 and 10). The boat-shaped ribbon plate 203, thus retained by the magnet 250, is slid in the next operating cycle by a claw 262 formed on the swinging member 260, so as to be transported to the assembly chucks 171 of the index unit (see FIG. 10).

The film cartridge assembling device also rounds the ribbon plate, formed to a boat shape, to a cylindrical shape, introduces a cap to one side end of the rounded ribbon plate, and clinches the cap to the ribbon plate, to assemble the one-capped cartridge. The film cartridge assembling device includes an assembly chuck for detachably holding the ribbon plate for transporting the ribbon plate to the respective process as the ribbon plate is kept to a predetermined shape.

In a certain conventional assembly chuck, shown in FIG. 18, a ribbon plate 550, bent substantially to a cylindrical shape, is clamped with a support metal 660 from the bottom side of a cylindrical mandrel 630, while a straight portion 551 of the ribbon plate is retained by an adjustment guide 670 adapted for adjusting a film take-out gap between the straight portion 551 of the ribbon plate and a haze portion (folded portion) 552, having a port width 553.

Incidentally, with respect to a method for rounding the boat-shaped ribbon plate to a cylindrical shape, a variety of methods and apparatuses are made up, for example, there is a ribbon plate forming apparatus as shown in FIG. 24 (refer to JP Patent Kokai Publication No. JP-A-4-102844).

Referring to FIG. 24(A), in this ribbon plate forming apparatus 800, a boat-shaped ribbon plate 750 is placed astride on a die 801 having half-round-opposed recesses which can be moved from side to side, a support metal 803 cushioned by a spring 802 is arranged in the middle of the die 801, and a mandrel 804 which can move to the support metal 803 is arranged on top of the boat-shaped ribbon plate 750.

Referring to FIG. 24(B) next, when the mandrel 804 moves to the support metal 803 and enters between the recesses of the die 801, the ribbon plate 750 becomes like U-shape.

Referring to FIG. 24(C) further, when the mandrel 804 enters between the recesses of the die 801 completely, the ribbon plate 750 is rounded to a cylindrical shape by moving the mandrel 804 to the support metal 803 and winding up the ribbon plate 750 around the outer surface of the mandrel 804.

SUMMARY OF THE DISCLOSURE

In the first aspect, the conventional film cartridge manufacturing apparatus suffers from the following problem. That is, since the variegated functions exemplified by (1) the rounding of the ribbon plate, (2) cap insertion or (3) cap clinching are congested in the one-capped cartridge producing unit (120 of FIG. 6), among the respective stations arranged around the index unit, the residence time in one station is protracted, thus imposing limitations on the throughput per unit time. Conversely, there is produced blank time in the process other than the one-capped cartridge producing unit 120 during which no operation is performed, thus lowering the efficiency (see FIG. 6).

On the other hand, the ribbon plate transfer process of the conventional ribbon plate supply unit suffers from the following problems. That is, referring to FIGS. 7 and 8, (1) the tray 204 at the boat-shaped ribbon plate takeout position is at the lowest position of the mechanical system, thus increasing the stroke of the uplifting cylinder of the holding means 221; (2) the bottom surface of the holding means 220 is inclined by being rotated from a horizontal orientation to an angle which is in meeting with the angle of the inclined base 231 of the stocker, thus complicating the mechanical structure; (3) if the ribbon plates are not stacked evenly, such as when the number of the ribbon plates is short of a preset number or when a given ribbon plate is of a thin thickness due to fluctuations from one product to another, the ribbon plate 203, retained solely by the magnet or by the claws in the holding means 221, tends to descend due to the impact at the time of transportation or tilting, or (4) if a gap is produced between the neighboring ribbon plates 203, the ribbon plates may be tilted and fall down such that the plate surface of the ribbon plate tends to be sucked by the magnet of the holding means 221.

Moreover, referring to FIGS. 9 and 10, the ribbon plate transfer process of the conventional ribbon plate supply unit suffers from the problem that the arraying of the ribbon plates tends to be disturbed or out of order in a transition area of the stocker 230 from the inclined base 231 towards the outlet 232 of the stocker 230, referred to below as an R area, in which the angle of inclination is changed, thus producing ribbon plate take-out error or cessation of the entire operation.

According to the inventor's view, the reason for such disturbed arraying of the ribbon plates is presumably such that, first of all, the line pressure is fractionated when the boat-shaped ribbon plates are thrust from a high side by for example a stacker weight at the R area, such that the force is not applied uniformly up to the outlet 232, secondly, the friction of the upper end faces of the boat-shaped ribbon plates with the chute contact surface and that between the lower end faces of the boat-shaped ribbon plates with the chute contact surface tend to be nonuniform during the time the ribbon plates are moved through the R area, and that, third, there is produced a timing differential between the timing of taking out the ribbon plates one-by-one and the timing of transport (movement) of the ribbon plates by the stacker weight.

In the second aspect, if the port width 553 is adjusted by an adjustment guide 670, as in the conventional assembly chuck, the magnitude of the port width 553 is varied due to fluctuations in the characteristics of the spring plate used in the ribbon plate 550 (spring back or SB), thus producing shape instabilities of the ribbon plates 550 (see FIG. 18).

In addition, if, in the conventional assembly chuck, the movement speed increases, the ribbon plates cannot be held in stability, so that the above problem is felt more acutely. Thus, in clinching the cap, the cap or the ribbon plate tends to be deformed. Moreover, if the shape of the film cartridge deviates from the true circle, localized pressure is applied to the internal film thus grazing the film as an ultimate product. Furthermore, there are occasions where the deviation in the port width or the ends of the haze (folded) or straight portions exceeds the values prescribed in the standard to cause light to be intruded into the film cartridge to cause troubles in light shielding properties in the film.

In the third aspect, it is also a problem in the conventional ribbon plate forming apparatus that the final product of the ribbon plate shows a polygonal shape by the formation of slightly over-bent portion (see 753 of FIG. 24(B)) due to the spring back effect of the ribbon plate when the ribbon plate is tried to round under high speed operating conditions.

In the conventional ribbon plate forming apparatus, the rounding operation of the ribbon plate using the pressure of the resiliency material such as a spring, tends to vibrate severely and become unstable with discontinuous movement. As a result, the pressure to the ribbon plate is nonuniform and the stability or accuracy of shape of, the rounded ribbon plate is impaired.

It is further a problem in the conventional ribbon plate forming apparatus that the press of the rounded ribbon plate between the recess of die and the mandrel grazes the surface of the ribbon plate due to the friction between the surface of recess of die and the outer surface of the ribbon plate.

In the first aspect, it is an object of the present invention to provide a method and apparatus for manufacturing a film cartridge which lends itself to high speed operation.

It is an another object in the first aspect of the present invention to provide a method and apparatus for supplying a plate material having a simplified mechanism.

It is a further object in the first aspect of the present invention to provide a method and apparatus for supplying a plate material capable of supplying boat-shaped ribbon plates in stability.

In the second aspect, it is an object of the present invention to provide a film cartridge assembling apparatus capable of holding the boat-shaped ribbon plates in stability even under high speed operating conditions.

It is an another object in the second aspect of the present invention to provide a film cartridge assembling apparatus capable of assuring stabilized (uniform) film cartridge shape even under high speed operating conditions.

In the third aspect, it is an object of the present invention to provide a film cartridge forming apparatus capable of approximating the rounded shape of the ribbon plate to a perfect circle under high speed operating conditions.

It is an another object in the third aspect of the present invention to provide a film cartridge forming apparatus capable of carrying out a stabilized operation under high-speed operating conditions.

It is a further object in the third aspect of the present invention to provide a film cartridge forming apparatus capable of preventing the grazing on the surface of the ribbon plate.

In an aspect 1a, the present invention provides a method for manufacturing a film cartridge comprised of a ribbon plate rounded to a cylindrical shape so as to leave a gap for taking out a film, and a cap clinched to an end of the rounded ribbon plate, by an apparatus including a plurality of assembly chucks, each for detachably holding the ribbon plate, index unit rotatable about a rotation axis as center and adapted for holding the assembly chucks at a preset angular interval about the rotation axis, and driving unit for intermittently rotating the index unit at an angular pitch equal to the preset angular interval, in which the method includes a first step of introducing a ribbon plate, rounded to a cylindrical shape, to an assembly chuck capable of receiving the ribbon plate, when the assembly chuck is halted at a halt position, a second step of inserting the cap to a side end of the ribbon plate, in conjunction with the first step, when the assembly chuck, holding the ribbon plate in the cylindrically rounded state, is halted at a different halt position, and a third step of clinching the cap to the ribbon plate, in conjunction with the first step, when the assembly chuck, holding the ribbon plate, having the cap inserted therein, is halted at a further different halt position.

Preferably, the film cartridge manufacturing method further includes a fourth step of rounding the ribbon plate transported as a substantially flat plate in conjunction with the first step to a cylindrical shape before inserting the rounded ribbon plate into the assembly chuck.

Preferably, the film cartridge manufacturing method further includes a fifth step of detecting, in conjunction with the first step, whether or not the ribbon plate having the cap clinched thereto is acceptable, when the assembly chuck, holding the ribbon plate having the cap clinched thereto, is halted at a further different halt position, a sixth step of discharging, in conjunction with the first step, a ribbon plate, found to be acceptable, based on detected results, when the assembly chuck, holding the detected ribbon plate, is halted at a further different halt position, and a seventh step of discharging, in conjunction with the first step, a ribbon plate not discharged as being acceptable, when the assembly chuck is halted at a further different halt position.

In an aspect 1b, the present invention provides a plate material supplying method including a step of uplifting a tray, loaded with a plurality of substantially flat plates, aligned in upstanding positions, to a preset height, a step of tilting the tray from a horizontal state to a preset angle, and a step of holding together the preset number of plates set on the tray maintained in uplifted and tilted state, and transferring the plates in the tilted state at the preset angle onto an inclined base of a stocker inclined at the same angle as the preset angle.

In an aspect 1c, the present invention provides a plate material supplying method including a step of sliding together the plural substantially flat plates, aligned in upstanding positions on the inclined base, towards a low side, and retaining the plates in the vicinity of a outlet of the stocker, and a step of sucking and taking out the plates in the upstanding positions one by one from the outlet of the stocker, by suitably alternately retaining and releasing the plates, and setting the sucked plates from the upstanding positions to the horizontal positions.

Preferably, the plate material supplying method further includes a step of holding the plates in the horizontal positions on an upper surface of a transport table including a magnet and transporting the plates to the next step.

In an aspect 1d, the present invention provides an apparatus for manufacturing a film cartridge including a plurality of assembly chucks each for detachably holding a ribbon plate, index unit adapted for being rotated about a rotation axis and for holding the assembly chucks at a preset angular interval about the rotation axis, driving unit for intermittently rotating the index unit at an angular pitch equal to the preset angular interval, ribbon plate inserting unit for inserting a ribbon plate, rounded to a cylindrical shape, into an assembly chuck, capable of receiving the ribbon plate, when the assembly chuck is halted at a halt position, capping unit for inserting, in conjunction with the operation of the ribbon plate inserting unit, a cap into a side end of the ribbon plate, when the assembly chuck, holding the ribbon plate in the cylindrically rounded state, is halted at a different halt position, and clinching unit for clinching and affixing the cap to the ribbon plate, in conjunction with the operation of the ribbon plate inserting unit, when the assembly chuck, holding the ribbon plate, having the cap inserted therein, is halted at a further different halt position.

Preferably, the film cartridge manufacturing apparatus of the present invention further includes forming unit for rounding the ribbon plate as a substantially flat plate, to a cylindrical shape, in conjunction with the operation of the ribbon plate inserting unit, before delivering the rounded ribbon plate to the ribbon plate inserting unit.

Preferably, the film cartridge manufacturing apparatus further includes inspecting unit for detecting, in conjunction with the operation of the ribbon plate inserting unit, whether or not the ribbon plate having the cap clinched thereto is acceptable, when the assembly chuck, holding the ribbon plate having the cap clinched thereto, is halted at a further different halt position, acceptable ribbon plate discharging unit for discharging, in conjunction with the operation of the ribbon plate inserting unit, a ribbon plate, found to be acceptable, based on detected results, when the assembly chuck, holding the detected ribbon plate, is halted at a further different halt position, and remnant discharging unit for discharging, in conjunction with the operation of the ribbon plate inserting unit, a ribbon plate not discharged as being acceptable, when the assembly chuck is halted at a further different halt position.

In an aspect 1e, the present invention provides an apparatus for supplying plate materials including a stocker including an inclined base, tilted to an angle equal to the tilt angle of the tray, for holding together a plurality of substantially flat plates, aligned in upstanding positions on the inclined base, and a outlet for taking out the plates thus held from a low side of the inclined base, a slide mechanism for sliding together the plural substantially flat plates, aligned in upstanding positions on the inclined base, towards a low side, retention unit for retaining the plates, slid thereto, in aligned upstanding positions, and suitably releasing the retention to enable the plates to be taken out one by one, and a suction transport mechanism including suction unit for sucking, one by one, the plates, taken out via a outlet of the stocker, and transporting unit for transporting the plates, sucked by the suction unit, from the upstanding position to the horizontal position.

Preferably, the plate material supplying apparatus of the present invention includes a transport table having a magnet internally mounted thereto for holding the ribbon plates, sucked and transported thereto in the horizontal positions, and transporting unit for transporting the ribbon plates held on an upper surface thereof to the next process step unit.

In an aspect 1f, the plate material supplying apparatus of the present invention further includes a lifter for uplifting the tray, loaded with the plural substantially flat plates, in the aligned upstanding positions, to a preset height, a tilt mechanism for tilting the tray from the horizontal position to a tilt angle corresponding to the tilt angle of the inclined base, holding means including gripper having a bottom surface inclined to the same angle as the tilt angle of the inclined base and an internally mounted magnet, the gripper gripping the plate on the bottom surface, the holding means holding together a preset number of said plates set on the inclined tray by suction by the magnet onto the bottom surface and gripping by the gripper, and a transport mechanism connected to the holding means for transporting the plates held by the holding means to a preset position as the angle of the bottom surface of the holding means is maintained.

In an aspect 2a, the present invention provides a film cartridge assembling apparatus for assembling a film cartridge, made up by a ribbon plate holding a photographic roll film therein and a cap, in which the apparatus includes one or more assembly chuck(s) each including two form elements formed by combining partial cylindrical inner surfaces thereof together, the circumference of a resulting cylinder being partially cut to form an opening, one of the form elements including a member having a flat surface extending from an end of the cylindrically-shaped inner surface. The member is adjustably mounted to the one of the form elements. The assembly chuck is able to assume a closed state in which the two inner surfaces of the two form elements are matched to each other to form a cylindrical inner surface and an opened state in which ends of the two form elements substantially parallel to the center axis of the cylindrical inner surface are spaced apart from each other.

Preferably, the other of the form elements includes an edge member having an edge end facing the one of the form elements. The edge member is adjustably combined with the end of the cylindrical inner surface of the other form element.

In an aspect 2b, the present invention provides a film cartridge assembling apparatus for assembling a film cartridge made up by a ribbon plate, holding a photographic roll film therein, and a cap, in which the apparatus includes one or more assembly chuck(s) each including two form elements formed by combining partial cylindrical inner surfaces thereof together, the circumference of a resulting cylinder being partially cut to form an opening. One of the form elements includes a member having a flat surface extending from an end of the cylindrically-shaped inner surface, and which is adjustably mounted to the one form element, while the other of the form elements includes an edge member having an edge end facing the one form element, and which is adjustably combined with the end of the cylindrical inner surface of the other form element. The two form elements are able to assume a closed state in which the two inner surfaces of the two form elements are matched to each other to form a cylindrical inner surface and an opened state in which ends of the two form elements substantially parallel to the center axis of the cylindrical inner surface are spaced apart from each other. The angle between a line interconnecting the center axis and the edge end and a line interconnecting a boundary line between the cylindrical inner surface and the flat surface and the center axis in the transverse cross-section in the closed state is not less than 25° and not larger than 50°.

In this film cartridge assembling apparatus, the angle between a line interconnecting the center axis and the edge end and a line interconnecting a boundary line between the cylindrical inner surface and the flat surface and the center axis in the transverse cross-section in the closed state is not less than 30° and not larger than 40°.

Preferably, the film cartridge assembling apparatus further includes a magnet internally mounted in the vicinity of a distal end face of the mandrel.

Preferably, the film cartridge assembling apparatus further includes a discharging mechanism for discharging a ribbon plate or a one-capped cartridge, held by the mandrel, and which is made up by a ribbon plate and a cap clinched to a single side end of the ribbon plate, when the form elements are opened apart from each other.

In the film cartridge assembling apparatus of the present invention, the discharging mechanism preferably includes one or more guide grooves formed in the horizontal direction in a cylindrical surface of the mandrel, and a component of the discharging mechanism having a pin slidable in the guide groove, the component of the discharging mechanism thrusting an end of the ribbon plate for discharging the ribbon plate by the distal end of the mandrel.

Preferably, the film cartridge assembling apparatus includes index unit rotatable about a rotation axis as center and adapted for holding the assembly chucks at an equiangular interval about the rotation axis, and driving unit for intermittently rotating the index unit at an angular pitch equal to the angular interval.

In the film cartridge assembling apparatus of the present invention, the index unit is preferably arranged with its rotation axis mounted at right angles to a substantially horizontal surface and is held such that the long axis of the assembly chuck is substantially horizontal and is oriented towards the rotation axis.

In an aspect 3a, the present invention provides a film cartridge forming apparatus for rounding a ribbon plate of a film cartridge, having accommodated therein a photographic roll film, comprising a mandrel having a cylindrically-shaped surface section, a rounding mechanism having a pair of first rollers mounted for rotation for rounding the ribbon plate to a cylindrical shape by said paired first rollers pressing said ribbon plate against said mandrel along said cylindrically-shaped surface section of said mandrel, as said ribbon plate is moved, and a guide mechanism for guiding the operation of said rounding mechanism so that said paired first rollers are moved along said cylindrically-shaped surface section of said mandrel.

In an aspect 3b, the present invention provides a film cartridge forming apparatus for rounding a ribbon plate of a film cartridge, having accommodated therein a photographic roll film, comprising a mandrel having a cylindrically-shaped surface section, a support metal for clamping the ribbon plate in cooperation with the mandrel as said ribbon plate is compressed against the cylindrically-shaped surface section of said mandrel, a rounding mechanism having a pair of first rollers mounted for rotation for rounding the ribbon plate to a cylindrical shape by said paired first rollers pressing both lateral sites of a clamp section for said ribbon plate against said mandrel along both outer sides of said support metal or the cylindrically-shaped surface section of said mandrel, as said ribbon plate is moved, and a guide mechanism for guiding the operation of said rounding mechanism so that said paired first rollers a removed along said cylindrically-shaped surface section of said mandrel.

In the film cartridge forming apparatus of the present invention, the rounding mechanism preferably includes a pair of second rollers mounted for rotation, said paired second rollers thrusting the cylindrically-shaped surface section of said ribbon plate when said ribbon plate is rounded by said paired first rollers.

In the film cartridge forming apparatus of the present invention, the guide mechanism preferably presses the ribbon plate against the paired first rollers and guides the operation of said rounding mechanism so that a portion of said ribbon plate compresses against the cylindrically-shaped surface section of said mandrel.

In the film cartridge forming apparatus of the present invention, the guide mechanism preferably includes a pair of cam followers operatively associated with said paired first rollers and a guide member having a groove for guiding said paired cam followers so that said paired first rollers are moved along the cylindrically-shaped surface section of said mandrel.

In the film cartridge forming apparatus of the present invention, there are preferably provided a retention pawl for retaining a haze part and a straight part of the rounded ribbon plate and a feed claw for feeding out the ribbon plate as said haze part and a straight part of the ribbon plate are retained.

In the film cartridge forming apparatus of the present invention, the mandrel preferably includes a passage section for transporting the ribbon plate in a portion thereof extending from the clamp section with said support metal, and a magnet mounted in the vicinity of the bottom of a recess formed in the bottom of said passage section as said magnet is separated from the bottom of said surface section.

BRIEF DESCRPTION OF THE DRWINGS

FIGS. 21(A) to 21(C) are partial, side views schematically showing the states of rounding (on the way of ascending) of the film cartridge forming apparatus of the third embodiment of the present invention.

Figure 22:
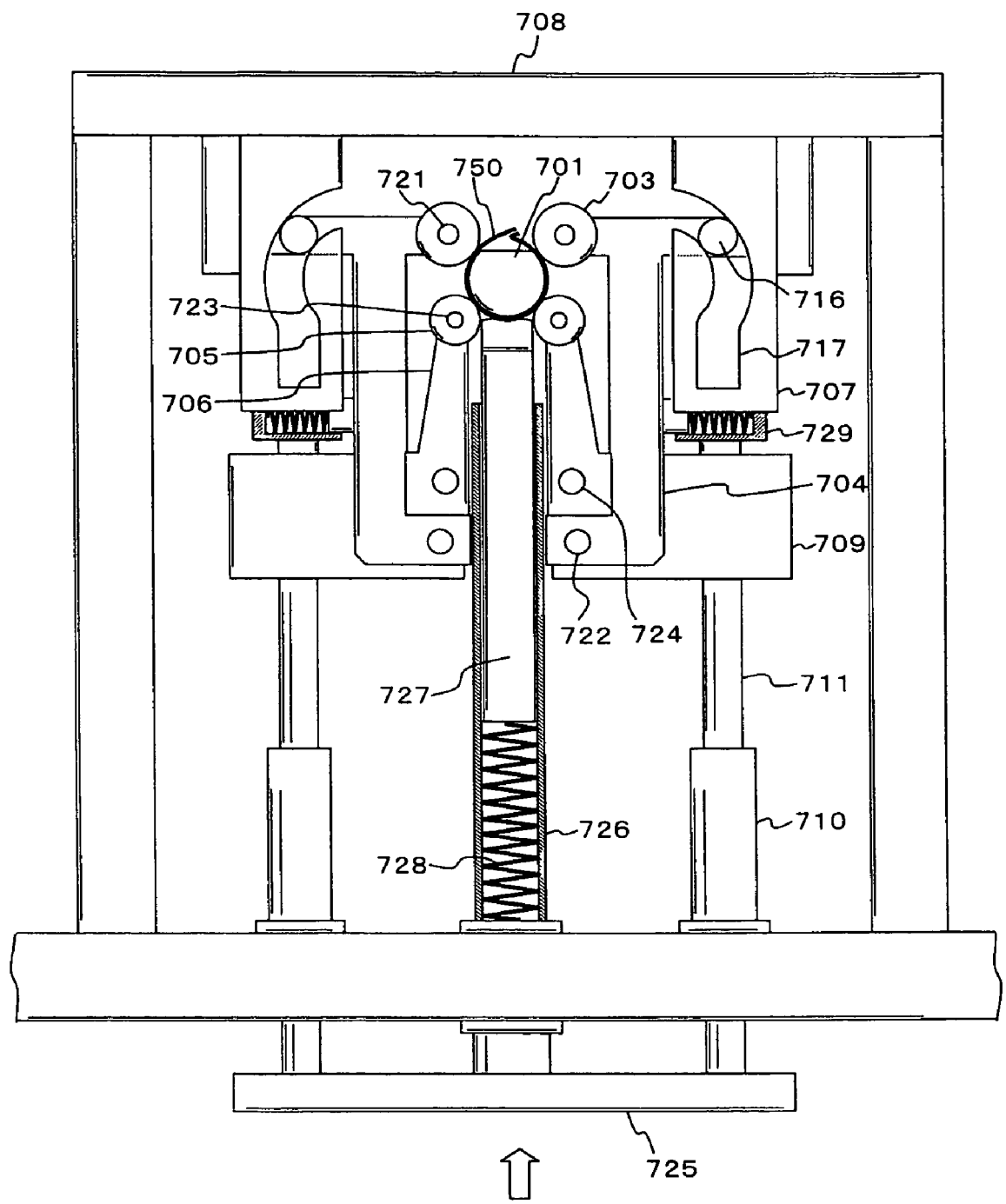

FIG. 22 is a partial side view schematically showing the state of rounding (end of ascending) of the film cartridge forming apparatus of the third embodiment of the present invention.

Figure 23:
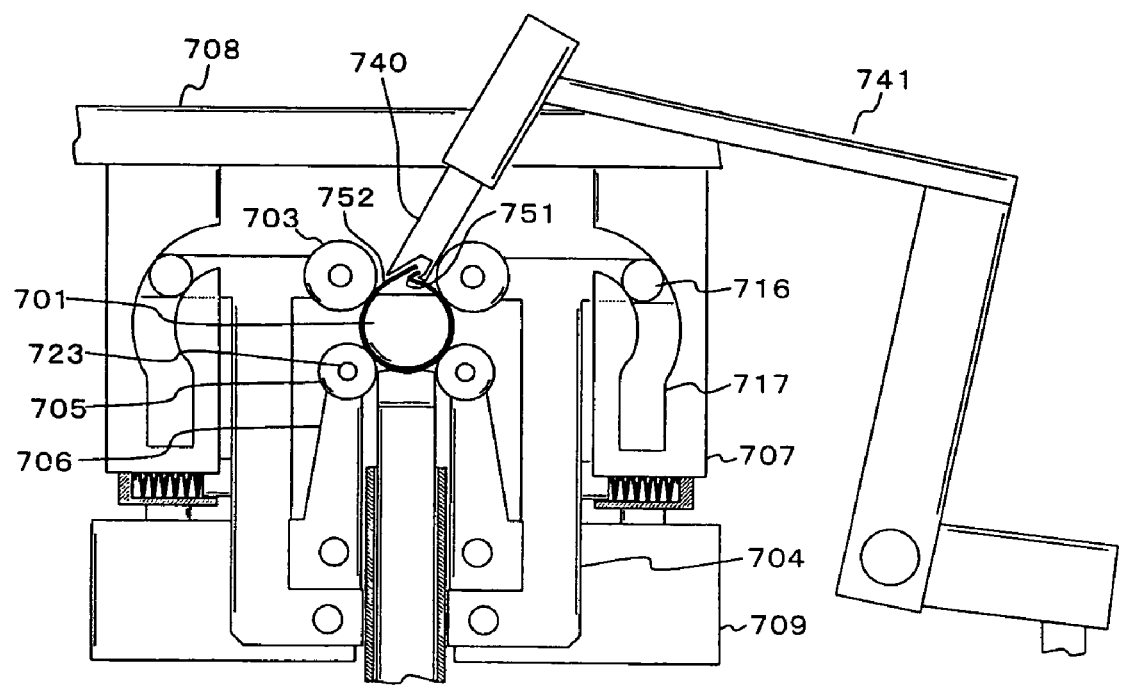

FIG. 23 is a partial side view schematically showing the state of retention of the film cartridge forming apparatus of the third embodiment of the present invention.

FIGS. 24(A) to 24(C) are partial side views schematically showing a structure of conventional film cartridge forming apparatus.

PREFERRED EMBODIMENTS OF THE INVENTION

An apparatus for manufacturing a film cartridge, made up by a ribbon plate holding a photographic roll film therein and a cap, includes a plurality of assembly chucks (10 of FIG. 1) each for detachably holding a ribbon plate, index unit (9 of FIG. 1) adapted for being rotated about a rotation axis and for holding the assembly chucks at a preset angular interval about the rotation axis, driving unit (16 of FIG. 1) for intermittently rotating the index unit at an angular pitch equal to the preset angular interval, ribbon plate inserting unit (15 of FIG. 1) for inserting a ribbon plate, rounded to a cylindrical shape, into an assembly chuck, capable of receiving the ribbon plate, when the assembly chuck is halted at a halt position, capping unit (4 of FIG. 1) for inserting, in conjunction with the operation of the ribbon plate inserting unit, a cap into a side end of the ribbon plate, when the assembly chuck, holding the ribbon plate in the cylindrically rounded state, is halted at a different halt position and clinching unit (5 of FIG. 1) for clinching and affixing the cap to the ribbon plate, in conjunction with the operation of the ribbon plate inserting unit, when the assembly chuck, holding the ribbon plate, having the cap inserted therein, is halted at a further different halt position, whereby the process steps of ribbon plate rounding, cap insertion and cap clinching may be carried out simultaneously to shorten the residence time in the respective process steps.

An apparatus for supplying plate materials (11 of FIG. 2) includes a lifter (30, 31, 32 of FIG. 2) for uplifting a tray (13 of FIG. 2), loaded with a plurality of plate materials, aligned in upstanding positions, to a preset height, a tilting mechanism (40 of FIG. 2) for tilting the tray from the horizontal state to a preset angle, holding means (51 of FIG. 2) including gripper (52 of FIG. 2) having a bottom surface (57 of FIG. 2) inclined to the same angle as the tilt angle of the tray and an internally mounted magnet (53 of FIG. 2) for gripping the ribbon plate on the bottom surface, the holding means holding together a preset number of ribbon plates set on the tray by suction by the magnet onto the bottom surface and gripping by the gripper, and a transport mechanism (54, 55, 56 of FIG. 2) connected to the holding means for transporting the ribbon plates held by the holding means to a preset position as the angle of the bottom surface of the holding means is maintained, whereby the ribbon plates can be transported in an evenly aligned state, so that there is scarcely any risk of dropping the plates from the holding means.

An apparatus for supplying plate materials (12 of FIG. 3) includes a stocker (60 of FIG. 3) including an inclined base (61 of FIG. 3), tilted at a preset angle, for holding a plurality of plates (14 of FIG. 3) in aligned upstanding positions on the inclined base, and a outlet (62 of FIG. 3) for taking out the plate materials thus held from the low side of the inclined base, a slide mechanism (66 of FIG. 3) for sliding together the plural plate members in aligned upstanding positions on the inclined base towards the low side, retention means (63 of FIG. 3) for retaining the plate materials, slid thereto, in the aligned upstanding positions, and for suitably releasing the retention to enable the plate materials to be taken out one by one, and a suction transport mechanism (70 of FIG. 3) including suction unit (71 of FIG. 3) for sucking the plate materials, taken out one by one from the outlet of the stocker, and transport mechanism (72 of FIG. 3) for transporting the ribbon plates sucked by the suction unit from the upstanding position to the horizontal position.

A film cartridge assembling apparatus for assembling a film cartridge, made up by a ribbon plate (550 of FIG. 12) holding a photographic roll film therein and a cap, includes one or more assembly chuck(s) (520 of FIG. 12) each including two form elements (521, 522 of FIG. 12) formed by combining partial cylindrical inner surfaces (521*a*, 522*a* of FIG. 12) thereof together, the circumference of a resulting cylinder being partially cut to form an opening, one of the form elements (522 of FIG. 2) including a member (522 of FIG. 12) having a flat surface extending from an end of the cylindrically-shaped inner surface (522*a* of FIG. 12), the member being adjustably mounted to the one of the form elements, the assembly chuck being able to assume a closed state (FIG. 13(A)) in which the two inner surfaces of the two form elements are matched to each other to form a cylindrical inner surface and an opened state (FIG. 13(C)) in which ends of the two form elements substantially parallel to the center axis of the cylindrical inner surface are spaced apart from each other. Thus, the cylindrical inner surface of the ribbon plate may be retained by the cylindrical surface of the form element, while the straight portion of the ribbon plate may be retained by the (fixed) member combined with one of the form elements, so that the entire outer peripheral surface of the ribbon plate, excluding the film takeout port and the near-by area, may be retained, whereby the ribbon plate may be retained in stability even under high speed operations without fluctuations in the port width (width between the haze part and the end of the straight portion) due to spring back.

A film cartridge assembling apparatus for assembling a film cartridge made up by a ribbon plate (550 of FIG. 12) holding a photographic roll film therein and a cap, includes one or more assembly chuck(s) (520 of FIG. 12) each including two form elements (521, 522 of FIG. 12) formed by combining partial cylindrical inner surfaces (521*a*, 522*a* of FIG. 12) thereof together, the circumference of a resulting cylinder being partially cut to form an opening, one of the form elements (522 of FIG. 12) including a member (522*b* of FIG. 12) having a flat surface extending from an end of the cylindrically-shaped inner surface (522*a* of FIG. 12), the member being adjustably mounted to the one form element, the other of the form elements (521 of FIG. 12) including an edge member (521*b* of FIG. 12) having an edge end facing the one form element (522 of FIG. 12), the edge member being adjustably combined with the end of the cylindrical inner surface of the other form element, the two form elements being able to assume a closed state (FIG. 13(A)) in which the two inner surfaces of the two form elements are matched to each other to form a cylindrical inner surface and an opened state (FIG. 13(C)) in which ends of the two form elements substantially parallel to the center axis of the cylindrical inner surface are spaced apart from each other. The angle (θ of FIG. 12) between a line (542 of FIG. 12) interconnecting the center axis (540 of FIG. 12) and the edge end and a line (541 of FIG. 12) interconnecting a boundary line between the cylindrical inner surface and the flat surface and the center axis in the transverse cross-section in the closed state is not less than 25° and not larger than 50°. The cylindrically-shaped surface of the ribbon plate may be retained by the cylindrically-shaped surfaces of the form elements, while the haze part of the ribbon plate is retained by the edge member combined (secured) to the other form element and the straight portion of the ribbon plate is retained by the fixed chuck member combined with the one form element, so that, even under a high speed operation, the ribbon plate may be held in a state of producing a film cartridge in which the equilibrium may be maintained between the film pull-out torque and the light shielding properties, that is in a state of holding the ribbon plate by the entire circumference of the ribbon plate minus an arcuate area corresponding to the angle θ. It should be noted that, if the angle θ is too small, the film pull-out torque is increased, thus possibly causing malfunctions on the side camera. If conversely the angle θ is too large, light tends to be intruded via a port thus possibly deteriorating the light shielding properties. It is therefore desirable that the angle θ is larger than 25° and smaller than 50°.

A film cartridge forming apparatus for rounding a ribbon plate of a film cartridge, having accommodated therein a photographic roll film comprises a mandrel (701 of FIG. 19) having a cylindrically-shaped surface section, a rounding mechanism (704, 709, 710, 711, 721, 722 of FIG. 19) having a pair of first rollers (703 of FIG. 19) mounted for rotation for rounding the ribbon plate to a cylindrical shape by said paired first rollers pressing said ribbon plate against said mandrel along said cylindrically-shaped surface section of said mandrel, as said ribbon plate is moved, and a guide mechanism (704, 707, 716, 717 of FIG. 19) for guiding the operation of said rounding mechanism so that said paired first rollers are moved along said cylindrically-shaped surface section of said mandrel, resulting in that the track of the first rollers can be regulated by the guide mechanism even under a high speed operation.

Figure 1:
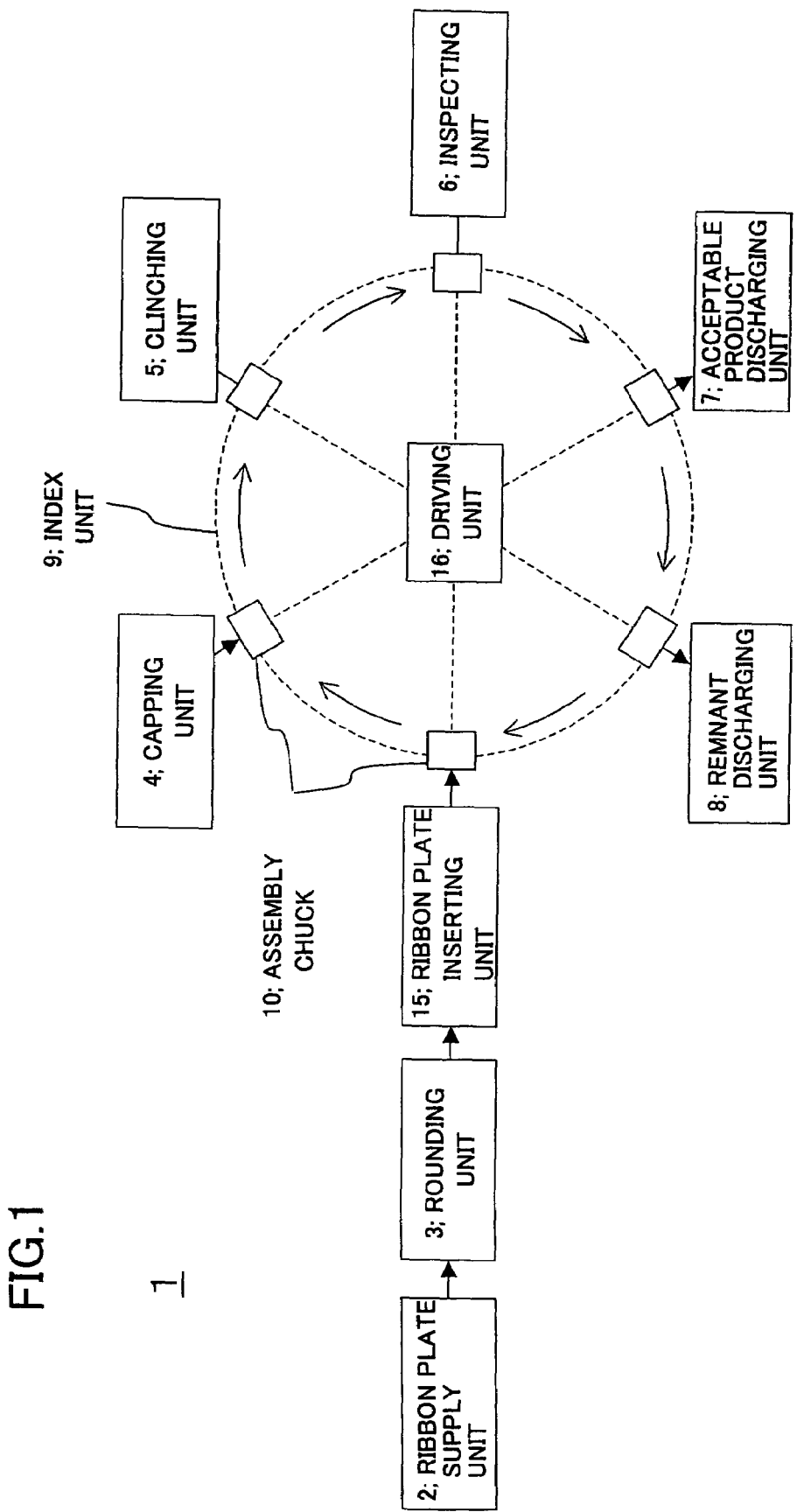
FIG. 1 is a block diagram schematically showing the structure of a film cartridge manufacturing apparatus of a first embodiment of the present invention.

A first embodiment of the present invention is now explained with reference to the drawings. FIG. 1 is a block diagram schematically showing a structure of a film cartridge manufacturing apparatus of the first embodiment of the present invention.

Referring to FIG. 1, this film cartridge manufacturing apparatus 1 uses a rotary index with six stations, and includes a ribbon plate supply unit 2, a rounding unit 3, a capping unit 4, a clinching unit 5, an inspecting unit 6, an acceptable product discharging unit 7, a remnant discharging unit 8, an index unit 9 and an assembly chuck 10.

The ribbon plate supply unit 2 is responsible for transferring a boat-shaped ribbon plate, loaded on a tray, and for supplying the transferred boat-shaped ribbon plate to a cylindrical shape (see FIG. 1). The detailed structure of this ribbon plate supply unit will be explained later on.

The rounding unit 3 is responsible for rounding the boat-shaped ribbon plate, supplied from the ribbon plate supply unit 2, to a cylindrical shape (see FIG. 1). For rounding the boat-shaped ribbon plate to a cylindrical shape, reference is had, as an example, to the Publication of the JP Patent Kokai JP-A-63-199035. A ribbon plate insertion unit 15 is arranged between the rounding unit 3 and the assembly chuck 10 of the index unit 9 lying in its vicinity. When the assembly chuck 10 is halted at a halt position, the ribbon plate insertion unit 15 introduces the ribbon plate, rounded to a cylindrical shape, into the assembly chuck 10, lying in the proximate position, in conjunction with the operation of the rounding unit 3, so that the opened portion of the ribbon plate, rounded to the cylindrical shape, will be located in the open portion of the assembly chuck 10.

When the index unit 9 is rotated one pitch and the assembly chuck 10 holding the rounded ribbon plate is held at another halt position, the capping unit 4 introduces the cap to one side end (outer peripheral side) of the ribbon plate, in conjunction with the operation of the rounding unit 3 (ribbon plate insertion unit 15) (see FIG. 1). The detailed structure of the capping unit 4 will be explained subsequently.

When the index unit 9 is rotated one pitch and the assembly chuck holding the ribbon plate, having the cap mounted thereto, is halted at another halt position, the clinching unit 5 clinches and secures the cap to the ribbon plate, in conjunction with the operation of the rounding unit 3 (ribbon plate insertion unit 15) (see FIG. 1). This clinching operation completes the one-capped cartridge as it is so-called. This clinching may be by any suitable conventional or non-conventional method. As for a typical conventional clinching method, reference is had to the JP Patent Kokai JP-A-63-199035.

When the index unit 9 has rotated one pitch and the assembly chuck holding the film cartridge, opened on its one side end, in another halt position, the inspecting unit 6 detects, in conjunction with the operation of the rounding unit 3 (ribbon plate insertion unit 15) whether or not the one-capped cartridge is acceptable (see FIG. 1). The detection method may be any suitable conventional or non-conventional detection methods provided that the methods used allow for detection whether or not the ribbon plate is acceptable or unacceptable, such as a method employing mechanical thrusting for detection, illuminating infrared rays to the one-capped cartridge to detect the reflected light, or processing and detecting the picture information as picked up by a camera.

When the index unit 9 is rotated one pitch and the assembly chuck holding the one-capped cartridge as detected is halted at another halt position, the acceptable product discharging unit 7 ejects the acceptable one-capped cartridge, based on the results as detected by the inspecting unit 6, in conjunction with the operation of the rounding unit 3 (ribbon plate insertion unit 15) (see FIG. 1). The discharging may be by any conventional or non-conventional detection methods.

When the index unit 9 is rotated one pitch and the assembly chuck 10 is halted at another halt position, the remnant discharging unit 8 ejects the one-capped cartridge, which has not been ejected as an acceptable product, or a remnant (for example, only a cap or a ribbon plate), in conjunction with the operation of the rounding unit 3 (ribbon plate insertion unit 15) (see FIG. 1). The discharging may be by any conventional or non-conventional discharging methods.

The index unit 9 may be rotated about a rotation axis as center to hold the six assembly chucks 10 at an equi-angular interval about the rotation axis (see FIG. 1). The index unit 9 is intermittently rotated by the driving unit 16 at an angular pitch equal to the angular interval. As for a conventional structure of the index unit 9, reference may be had to the Publication of the JP Patent Kokai JP-A-1-287670.

The assembly chuck 10 is a mechanical component for detachably gripping the ribbon plate. Six such assembly chucks 10 are mounted at equi-angular intervals about the rotation axis of the index unit 9 in association with the six stations (see FIG. 1). The assembly chuck 10 is capable of holding the ribbon plate in a cylindrically rounded condition. The assembly chuck 10 may be of any suitable conventional or non-conventional structure. As for a typical conventional assembly chuck 10, reference may be had to the Publication of the JP Patent Kokai JP-A-1-287670.

The operation of the film cartridge manufacturing apparatus of the first embodiment is now explained.

Referring to FIG. 1 first, the boat-shaped ribbon plate is supplied from the ribbon plate supply unit 2 to the rounding unit 3 where the boat-shaped ribbon plate supplied is rounded to a cylindrical shape.

The ribbon plate in the rounded state is transported to the near-by assembly chuck 10, in the halted state. In this assembly chuck 10, where the ribbon plate may be accepted, the ribbon plate is held in the cylindrically rounded condition (see FIG. 1).

When the index unit 9 is further rotated one pitch and halted at the next halt position, a cap is introduced at the capping unit 4 into one side end (outer peripheral side) of the ribbon plate, halted as described above (see FIG. 1).

When the index unit 9 is further rotated one pitch and halted at another halt position, the cap, already mounted to the ribbon plate, is clinched to the ribbon plate in the clinching unit 5 to form the one-capped cartridge (see FIG. 1).

When the index unit 9 is further rotated one pitch and halted at another halt position, the inspecting unit 6 monitors the state of engagement between the ribbon plate and the cap of the so formed one-capped cartridge to detect whether or not the one-capped cartridge is acceptable (see FIG. 1).

When the index unit 9 is further rotated one pitch and halted at another halt position, the acceptable product discharging unit 7 ejects the acceptable one-capped cartridge, based on the results detected by the inspecting unit 6 (see FIG. 1). If the one-capped cartridge has been found to be unacceptable, this unacceptable one-capped cartridge is not discharged.

When the index unit 9 is further rotated one pitch and halted at another halt position, and there exists the unacceptable one-capped cartridge, the remnant discharging unit 8 ejects the one-capped cartridge not discharged by the acceptable product discharging unit 7 or remnants (such as isolated caps or ribbon plates, left due to some unusual situation) are ejected (see FIG. 1).

When the index unit 9 is further rotated one pitch and halted at another halt position, the ribbon plate, rounded by the rounding unit 3, is introduced into the empty assembly chuck 10. The above-described sequence of operations then is repeated (see FIG. 1). The operations in the respective process step units are carried out in conjunction with one another such that a one-capped cartridge is completed for each one-pitch rotation of the index unit 9.

By the above structure, the rounding of the ribbon plate, cap insertion and cap clinching may be carried out in the film cartridge manufacturing apparatus simultaneously, thereby enabling a high speed operation. Moreover, since the process step units of ribbon plate rounding, cap insertion and cap clinching are scattered, the mechanical structure is simplified, thus assuring facilitated maintenance.

Figure 2:
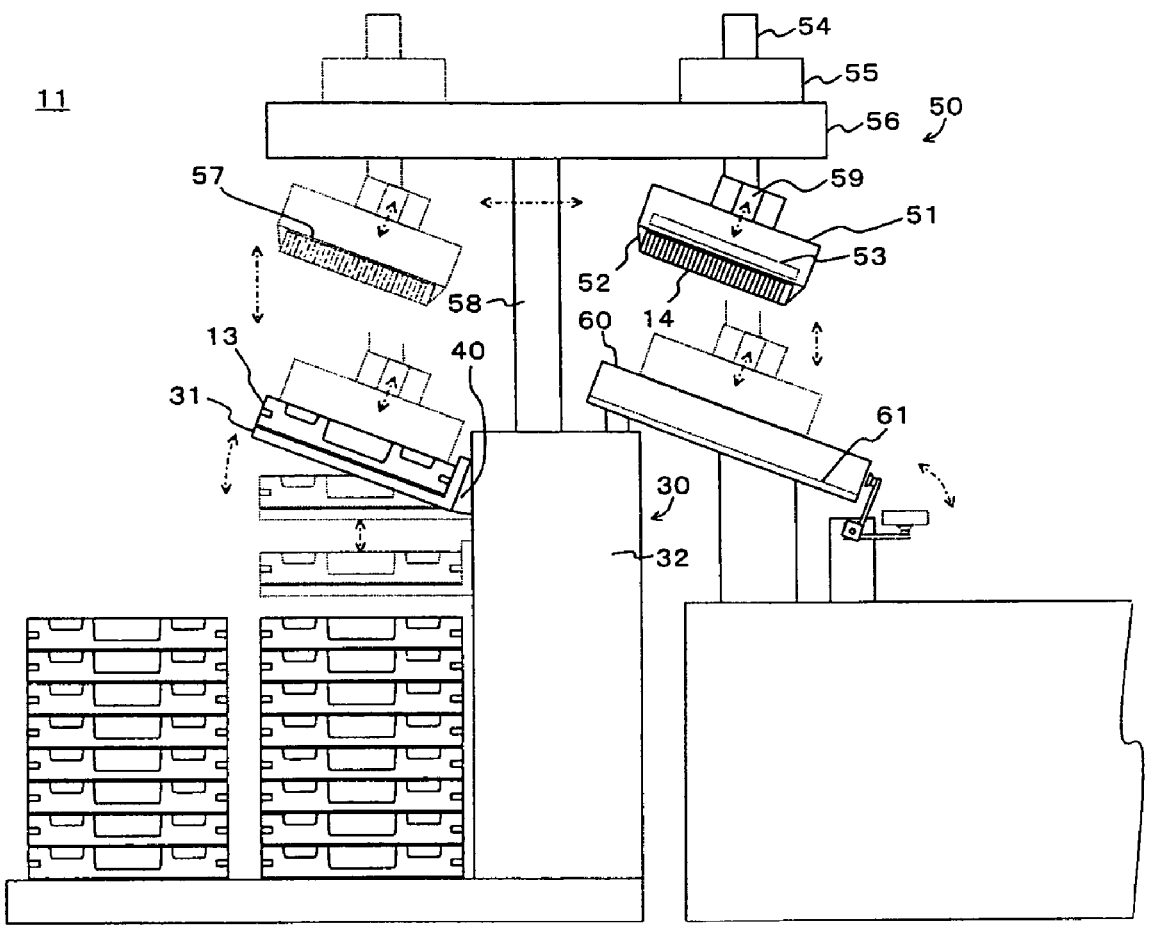
FIG. 2 is a side view schematically showing the structure of a ribbon plate transfer process sub-unit of a ribbon plate supply unit of a first embodiment of the present invention.
Figure 3:
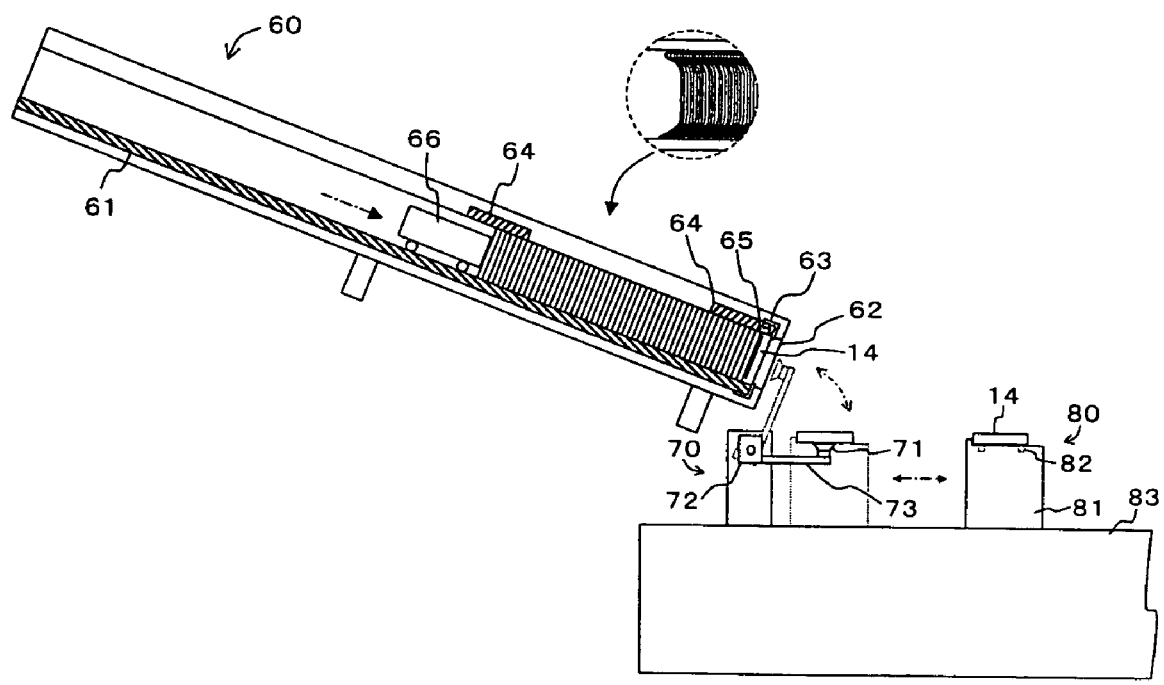
FIG. 3 is a side view schematically showing the structure of a ribbon plate supply process unit of the ribbon plate supply unit of the first embodiment of the present invention.

Referring to the drawings, the ribbon plate supply unit 2 of FIG. 1 is now explained. FIG. 2 is a side view schematically showing the structure of the ribbon plate transfer process of the ribbon plate supply unit of the first embodiment of the present invention. FIG. 3 is a side view schematically showing the structure of the ribbon plate supply process step unit of the ribbon plate supply unit of the first embodiment of the present invention. The ribbon plate supply process step unit may be divided into a ribbon plate transfer process for transferring a ribbon plate from a tray loaded with plural ribbon plates to a stocker, and a ribbon plate supply process unit for supplying ribbon plated accumulated in the stocker to the index unit.

Referring to FIG. 2, the ribbon plate transfer process 11 of the ribbon plate supply unit includes a lifter 30, a tilt mechanism 40, a transfer mechanism 50 and a stocker 60.

The lifter 30 includes a holding device 31 and a lifter 32 (see FIG. 2). The holding device 31 holds one of plural trays 13 stacked on a tray storage site. The lifter 32 is a means for uplifting the tray 13 held by the holding device 31 to a preset height or lowering the so uplifted tray. The tray 13 is loaded with plural boat-shaped ribbon plates aligned in an upstanding position.

The tilt mechanism 40 is a mechanism for tilting the tray 13, held by the holding means 13 of the lifter, from a horizontal plane to a predetermined angle (see FIG. 2).

The transfer mechanism 50 includes a gripper 51, a claw 52, a magnet 53, a cylinder 54, a sliding unit 55, a rail 56 and a reciprocating mechanism 59 (see FIG. 2).

The gripper 51 grips together a preset number of boat-shaped ribbon plates 14 from the tray 13 using the claw 52 (see FIG. 2). The tray 13 is kept in its height and inclination by the lifter 30 and the tilt mechanism 40. An abutment surface 57 of the gripper 51 against the end of the boat-shaped ribbon plate 14 is inclined in meeting with the tilt angle of the tray 13. In the transfer mechanism 50, no mechanism for changing the tilt angle of the gripper 51 is used.

The claw 52 is used for gripping both outer surfaces of the plate surface of the boat-shaped ribbon plate 14, aligned in the upstanding position in readiness for gripping. The claw is arranged on the longitudinal side edge of the abutment surface 57 of the gripper 51 (see FIG. 2).

The magnet 53 is used for sucking the end face of the boat-shaped ribbon plate 14 to the abutment surface 57 of the gripper 51, and is mounted within the gripper 51 in the vicinity of the abutment surface 57 (see FIG. 2).

The cylinder 54 is lifter for uplifting the gripper 51 to a preset height or lowering the uplifted gripper 51 (see FIG. 2).

The sliding unit 55 is means for sliding the cylinder 54 on the rail 56 linearly along the horizontal direction (see FIG. 2).

The rail 56 is a rail on which slides the sliding unit 55 and is connected to a column 58 so as to be extended to above the tray 13 and above the stocker 60 (see FIG. 2).

The reciprocating mechanism 59 is a cylinder for moving the gripper 51 towards the boat-shaped ribbon plate 14 set on the tray 13 (see FIG. 2).

The stocker 60 operates for supplying the accumulated boat-shaped ribbon plates 14 one-by-one and includes a tilted base 61 which is tilted to a preset angle which is the same as the tilt angle of the abutment surface 57 of the transfer mechanism 50 (see FIG. 2).

The operation of the ribbon plate transfer process 11 is now explained.

First, the tray 13, loaded with the plural boat-shaped ribbon plates 14, aligned in the upstanding positions, are uplifted to a preset height, using the lifter 30 (see FIG. 2).

Then, as the tray 13 is maintained at a constant height, the tray 3 is inclined to the same angle as the tilt angle of the abutment surface 57 of the transfer mechanism 50 (see FIG. 2). At this time, the boat-shaped ribbon plates 14 are offset towards one side. Thus, the gap between the neighboring ribbon plates is reduced to zero, with the ribbon plates being in a congested condition. Thus, the boat-shaped ribbon plates 14 are together subjected to the magnetic force of the magnet 53, thus assuring stable retention.

The gripper 51 of the transfer mechanism 50 is lowered onto the tray 13 and intruded into the boat-shaped ribbon plates 14 by the reciprocating mechanism 59 (see FIG. 2). The preset number of boat-shaped ribbon plates 14 are held together by the gripper 51 in the aligned upstanding position. The gripper 51 is uplifted, as it holds the boat-shaped ribbon plates 14, then is moved horizontally, and caused to descend at a position overlying the stock portion 60. The gripper 51 is then advanced towards the base surface to transfer the boat-shaped ribbon plates 14 onto an inclined base 61 of the stocker 60. If the boat-shaped ribbon plates 14 are offset to one side to produce a gap, the gripper 51 is in the inclined state at all times, so that the ribbon plates are held as they are inclined in an opposite direction to the direction in which the ribbon plates fall flat on the magnet 53, under the effect of gravity. Thus, the ribbon plates are not susceptive to fall down. Moreover, the claws 52 on both sides of the gripper 51 are pressured inwards, so that the ribbon plates may be retained in stability.

Thus, a set of the ribbon plates are transferred to the stocker 60 are transferred in the aligned upstanding position (see FIG. 2).

Referring to FIG. 3, the ribbon plate supply step unit 12 of the ribbon plate supply unit includes a stocker 60, a suction transport mechanism 70 and a receiving block 82

The stocker 60 is the same as the stocker 60 of the ribbon plate transfer process 11 of the ribbon plate supply unit of FIG. 2, and includes the inclined base 61, a outlet 62, a shutter 63, a retention plate 64, a magnet 65 and a stacker weight 66 (see FIG. 3). Meanwhile, in FIG. 3, the stocker 60 is shown in a longitudinal cross-section.

The inclined base 61 is a base operating as a storage site for plural boat-shaped ribbon plates 14, aligned in an upstanding position. The inclined base 61 is inclined to a preset angle which is the same as the angle of inclination of the abutment surface (see 57 of FIG. 2) of the transfer mechanism. The base surface is flat and, on the base member, the boat-shaped ribbon plates 14 are slid in the upstanding positions under the pressuring by the stacker weight (see FIG. 3).

The outlet 62 is an opening through which the boat-shaped ribbon plates 14 accommodated are taken out one-by-one from a lower side of the inclined base (see FIG. 3).

The shutter 63 is retention means for taking out the boat-shaped ribbon plates 14 one-by-one from the outlet 62, and is arranged in the vicinity of the outlet 62 so as to be opened/closed by cam driving (see FIG. 3).

The retention plate 64 is arranged at an upper part of the end of the boat-shaped ribbon plate 14 in order to put the height of the boat-shaped ribbon plates 14 in order (see FIG. 3). One such retention plate 64 is arranged half-way on the stocker 60 and another is arranged in the vicinity of the outlet 62. The intermediate retention plate 64 is moved in the up-and-down direction above the ends of the boat-shaped ribbon plates 14, while the retention plate 64 arranged in the in the vicinity of the outlet 62 is moved by cam driving in the up-and-down direction above the ends of the boat-shaped ribbon plates 14.

The magnet 65 is arranged inwardly of the retention plate 64 in the vicinity of the outlet 62 to prevent fall down of the ribbon plates during transport thereof (see FIG. 3).

The stacker weight 66 pressures the trailing end of the boat-shaped ribbon plates 14 aligned in the upstanding positions (high side) towards the outlet 62 (low side) of the boat-shaped ribbon plates 14 (low side). When the boat-shaped ribbon plates 14 are transferred from the tray (13 of FIG. 2), the stacker weight is moved by the cylinder towards the high side (see FIG. 3).

The suction transport mechanism 70 includes a suction unit 71 and a rotating mechanism 72 (see FIG. 3). The suction unit 71 is a means for sucking or desorbing the boat-shaped ribbon plates 14, taken out from the outlet 62 of the stocker, one-by-one by air adjustment. A collar formed of resin is mounted to the suction transport mechanism for inhibiting the pat from being deformed during suction. The rotating mechanism 72 is a means for rotating the suction unit 71, mounted to the arm 73, for transferring the boat-shaped ribbon plates 14 from the upstanding position to the horizontal position.

The receiving block 80 includes a base 81, a magnet 82 and a sliding mechanism 83 (see FIG. 3). The base portion 81 is a support on which to set the boat-shaped ribbon plate, transported by a suction transporting mechanism 70, in the horizontal position. The magnet 82 is mounted inwardly of the base 81 and is used for holding the boat-shaped ribbon plate 14, set on the base 81, in a prescribed position. The sliding means is a means for transporting the boat-shaped ribbon plate 14, placed thereon, to a rounding unit (3 of FIG. 1).

The operation of the ribbon plate supply step unit 12 of the ribbon plate supply unit is now explained.

The set of the boat-shaped ribbon plates 14, transferred on the stocker 60, is slid together by the stacker weight 66 as a group towards the low side, as the ribbon plates are aligned on the inclined base 61 in the upstanding positions (see FIG. 3). The ribbon plates 14 are retained by the shutter 63 and the ends thereof are aligned by the retention plate 64. This removes gaps or disorders in the boat-shaped ribbon plates 14 so that the hip-shaped ribbon plates 14 are positioned to facilitate takeout thereof one-by-one. The impact from the stacker weight 66 is absorbed by alternate operations of the intermediate retention plate 64 and the retention plate 64 in the takeout unit.

The boat-shaped ribbon plates 14, accumulated in the stocker 60, are sucked by a suction unit 71 of the suction transport mechanism 70, in the upstanding positions, and are taken out one-by-one from the outlet 62, by the operation of the retention plate 64 and by the opening/closure of the shutter 63, so as to transfer from the upstanding position to the horizontal position by the rotating mechanism 72 of the suction transport mechanism 70 (see FIG. 3). The boat-shaped ribbon plates 14, in the horizontal position, are held on the upper surface of the receiving block 80, and are transported in this state to the rounding mechanism (3 of FIG. 1).

Figure 4:
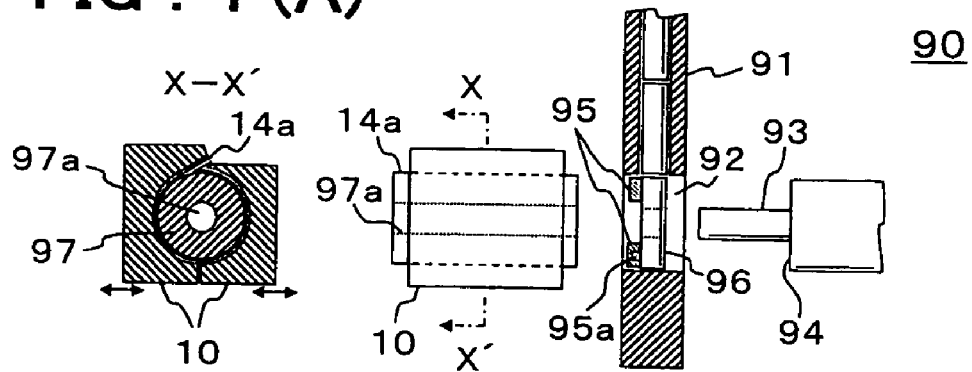
FIGS. 4A to 4D are cross-sectional views schematically showing the operation of a capping unit of the first embodiment of the present invention.
Figure 4:
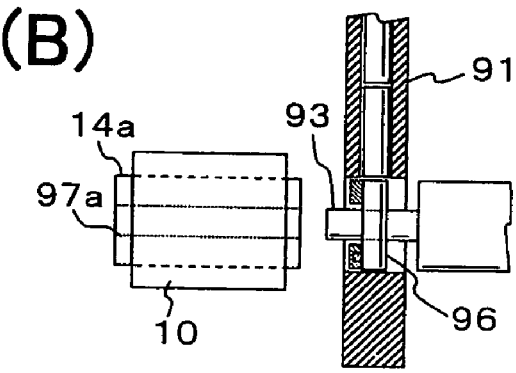
Figure 4:
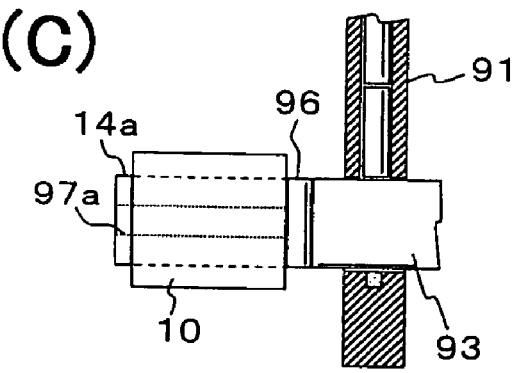
Figure 4:
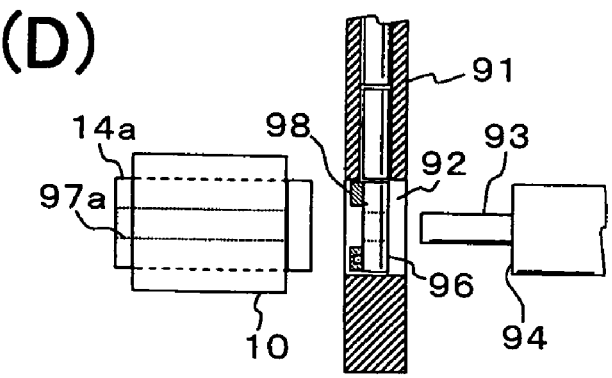
Figure 5:
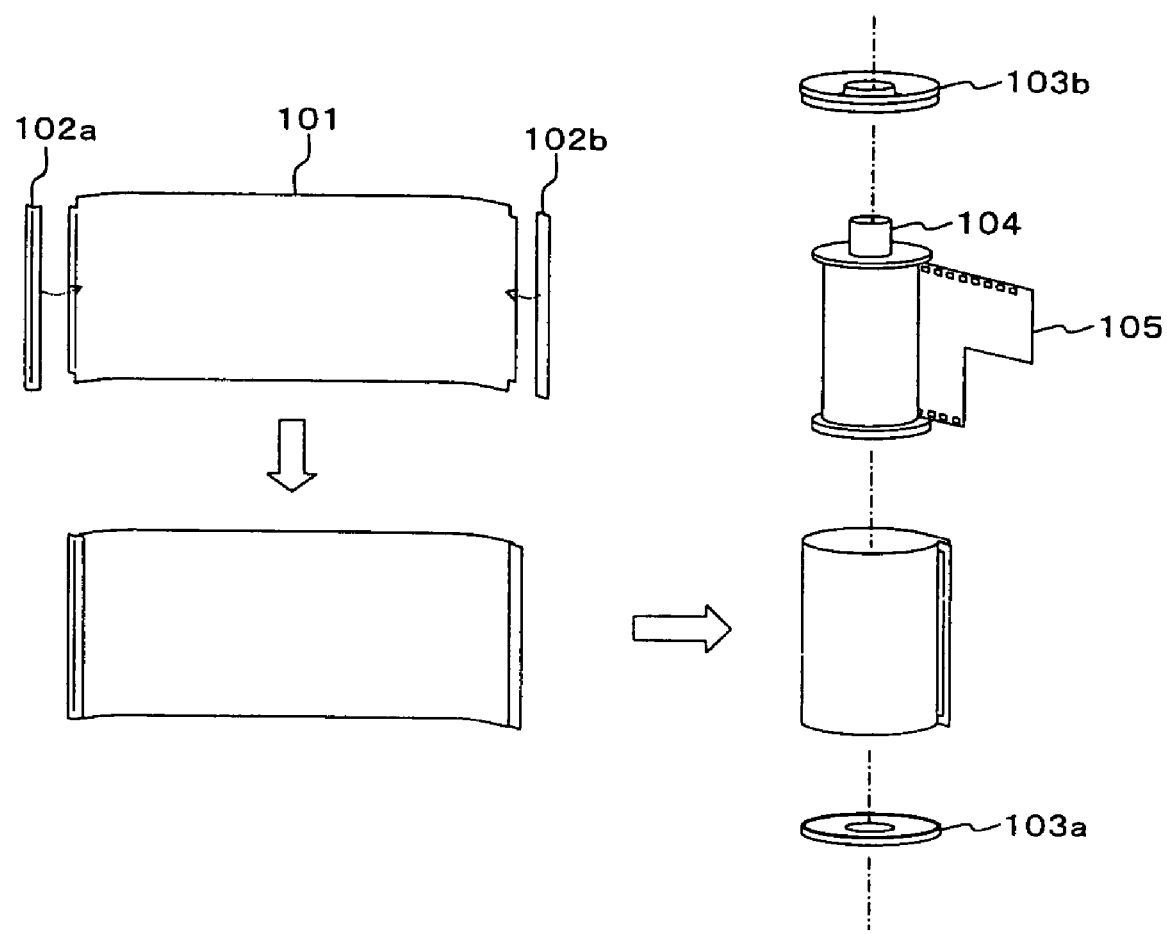
FIG. 5 is an exploded perspective view schematically showing the structure of the film cartridge.
Figure 6:
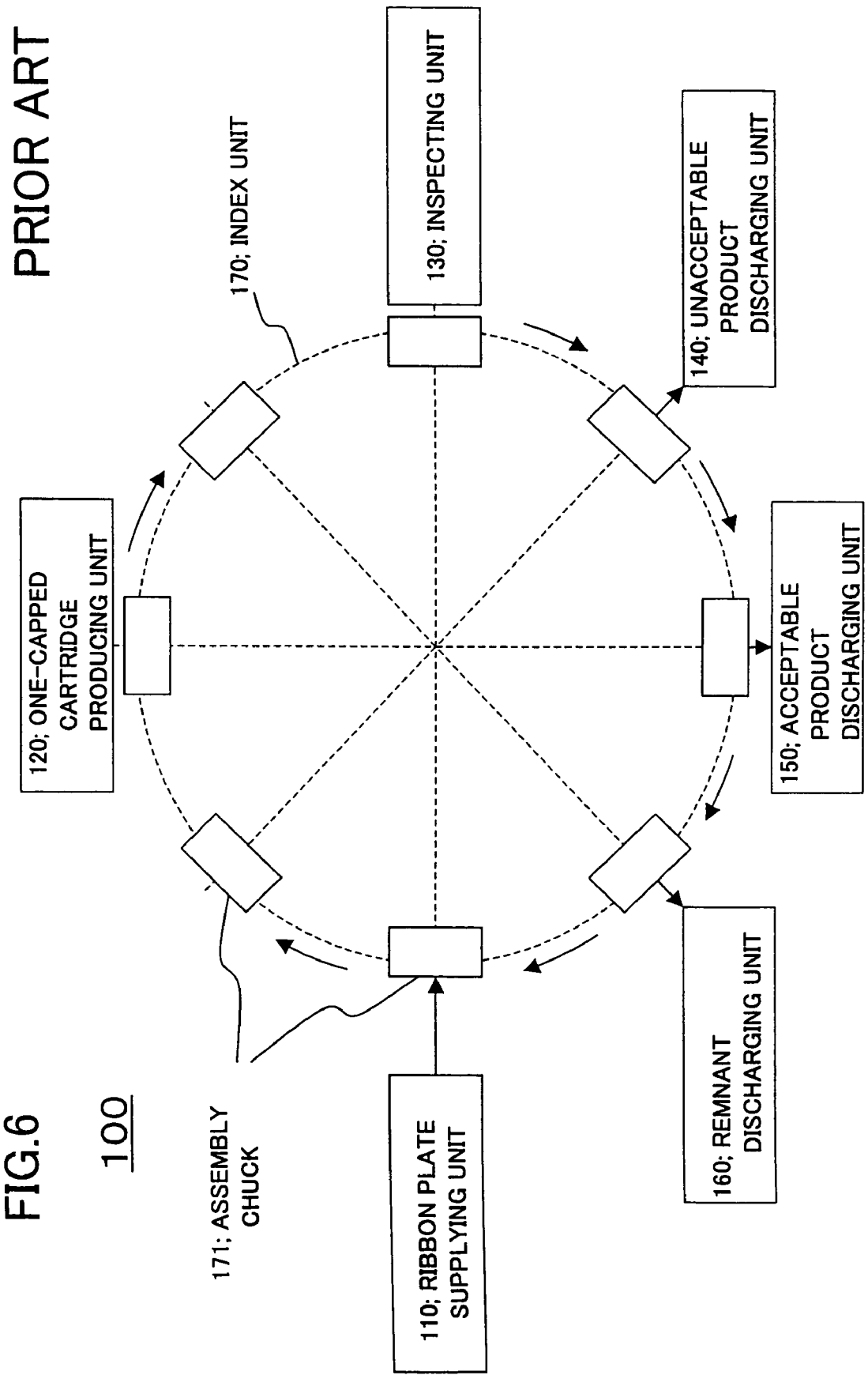
FIG. 6 is a block diagram schematically showing the structure of a conventional typical apparatus for producing a film cartridge.
Figure 7:
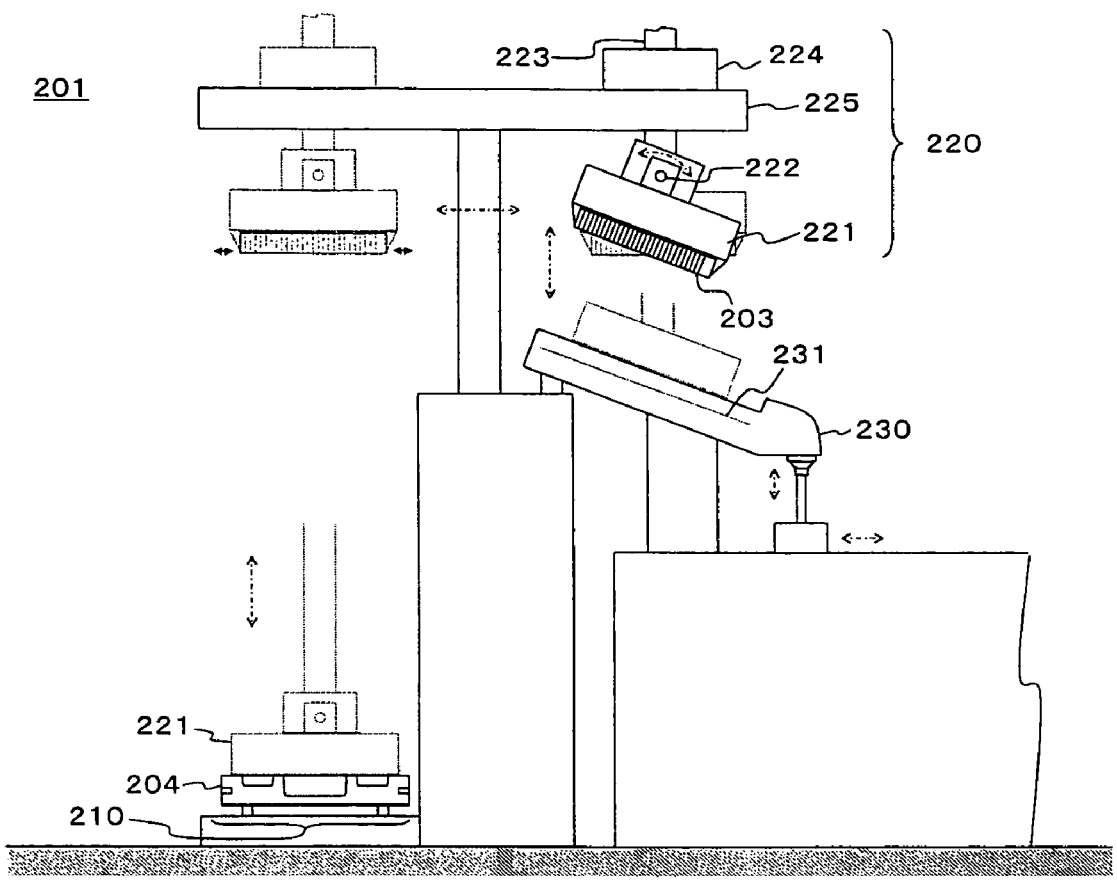
FIG. 7 is a side view schematically showing the structure of a ribbon plate transfer process sub-unit of a conventional typical ribbon plate supply unit
Figure 8:
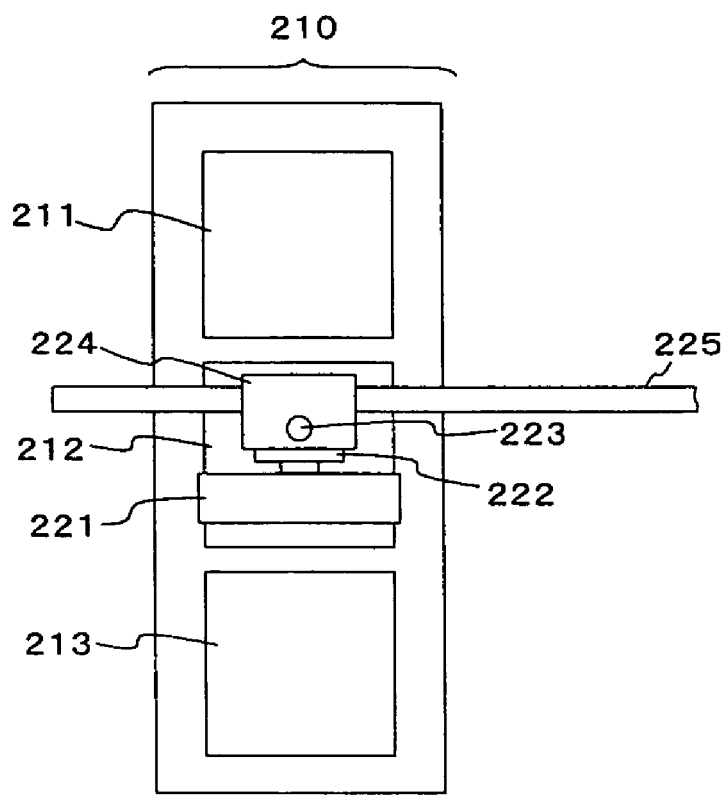
FIG. 8 is a partial plan view schematically showing the structure of the ribbon plate transfer process sub-unit of the conventional typical ribbon plate supply unit.
Figure 9:
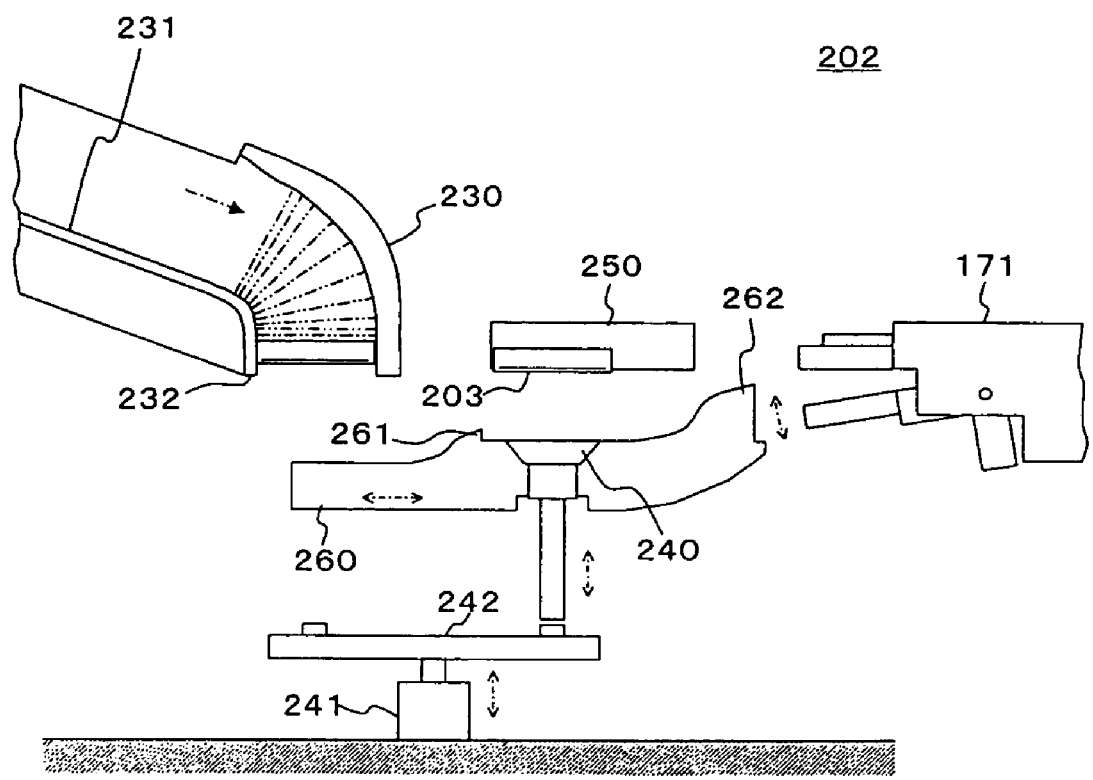
FIG. 9 is a first side view schematically showing the structure of a ribbon plate supply process unit of the conventional typical ribbon plate supply unit.
Figure 10:
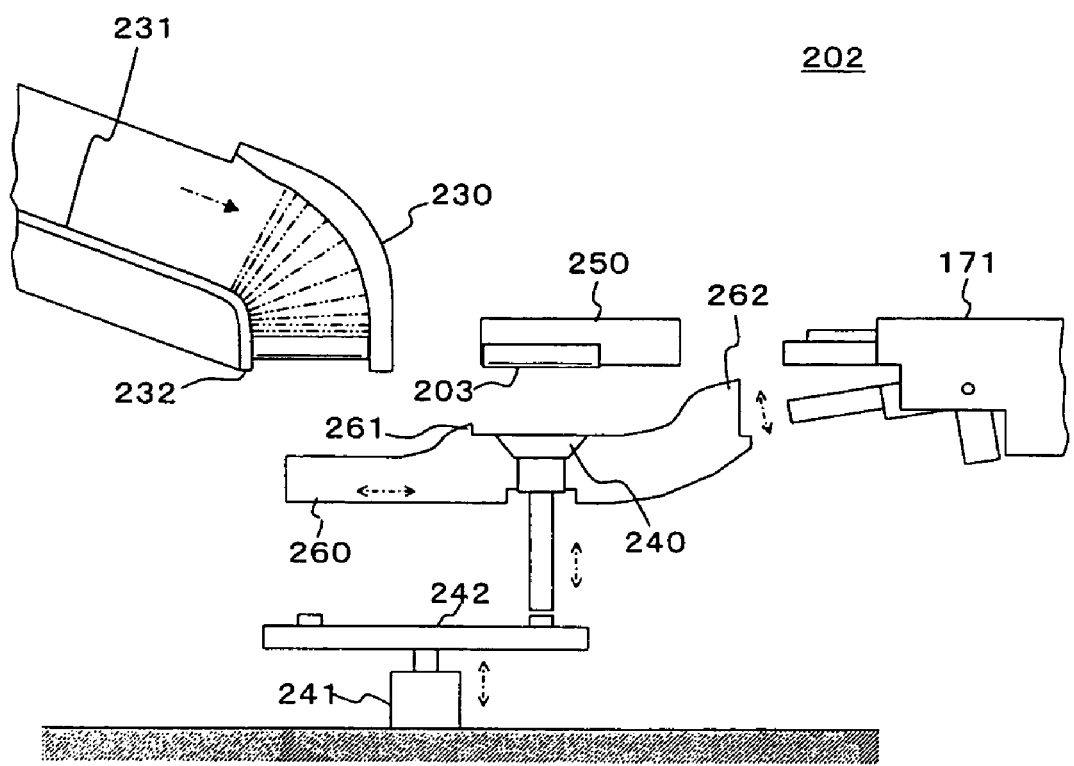
FIG. 10 is a second side view schematically showing the structure of a ribbon plate supply process unit of the conventional typical ribbon plate supply unit.

The capping unit 4 of FIG. 1 is now explained with reference to the drawings. FIG. 4 is a cross-sectional view for illustrating process steps schematically showing the operation of the capping unit of the first embodiment of the present invention.

Referring to FIG. 4, the capping unit 90 includes a cap supplying unit 91, a guide mandrel 93, a shutter 95 and a magnet 95a mounted inside a lower portion of the shutter.

The cap supplying unit 91 is adapted for supplying the cap 96 in an upstanding position for facilitated insertion thereof into the ribbon plate 14a held by the assembly chuck 10. The cap 96 is inserted to a supply opening 92. The reciprocable shutter 95 supports the four corners of the cap 96 to maintain the upstanding state of the cap 96 (see FIG. 4). The magnet 95a, mounted to the lower part of the shutter 95, operates for preventing fall down of the cap 96.

The guide mandrel 93 is inserted into an opening of the cap supported by the shutter. The end part of the guide mandrel is inserted into an opening 97a of a mandrel 97 of the assembly chuck 10. The guide mandrel 93 is used for inserting the cap 96 with its thrusting surface 94 to insert the cap as the cap is centered with respect to the one side end of the ribbon plate 14a held by the assembly chuck 10 (see FIG. 4).

Next, the operation of the capping unit 90 is now explained. The cap 96, supplied to the supply opening 92, is supported at its four corners by the shutter 95. The orientation of the cap 96 is held by the magnet 95a mounted to the lower inner end of the shutter (see FIG. 4A). The guide mandrel 93 then is inserted through the opening of the cap 96 held by the magnet (see FIG. 4B). The distal end of the guide mandrel 93 is introduced through the opening 97a of the mandrel 97 of the assembly chuck 10 at the standstill position. The cap 96 is thrust at its thrusting surface 94 and inserted thereby into the single side end of the ribbon plate held by the assembly chuck 10 FIG. 4C). The guide mandrel 93 then is withdrawn from the opening 97a of the mandrel 97 and the supply opening 92 (see FIG. 4D). When the assembly chuck holding the next (distinct) ribbon plate has been rotated and is at a standstill, a similar sequence of operations is repeated.

Figure 11:
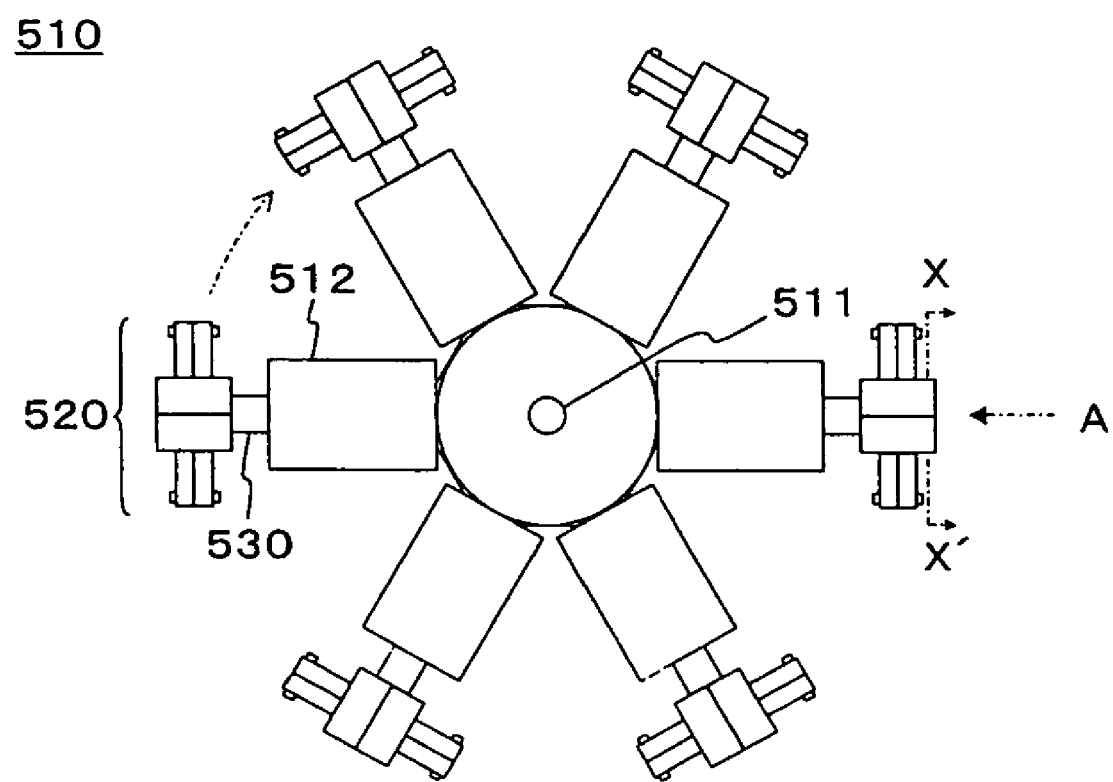
FIG. 11 is a plan view schematically showing the structure of a film cartridge assembling apparatus of a second embodiment of the present invention.
Figure 12:
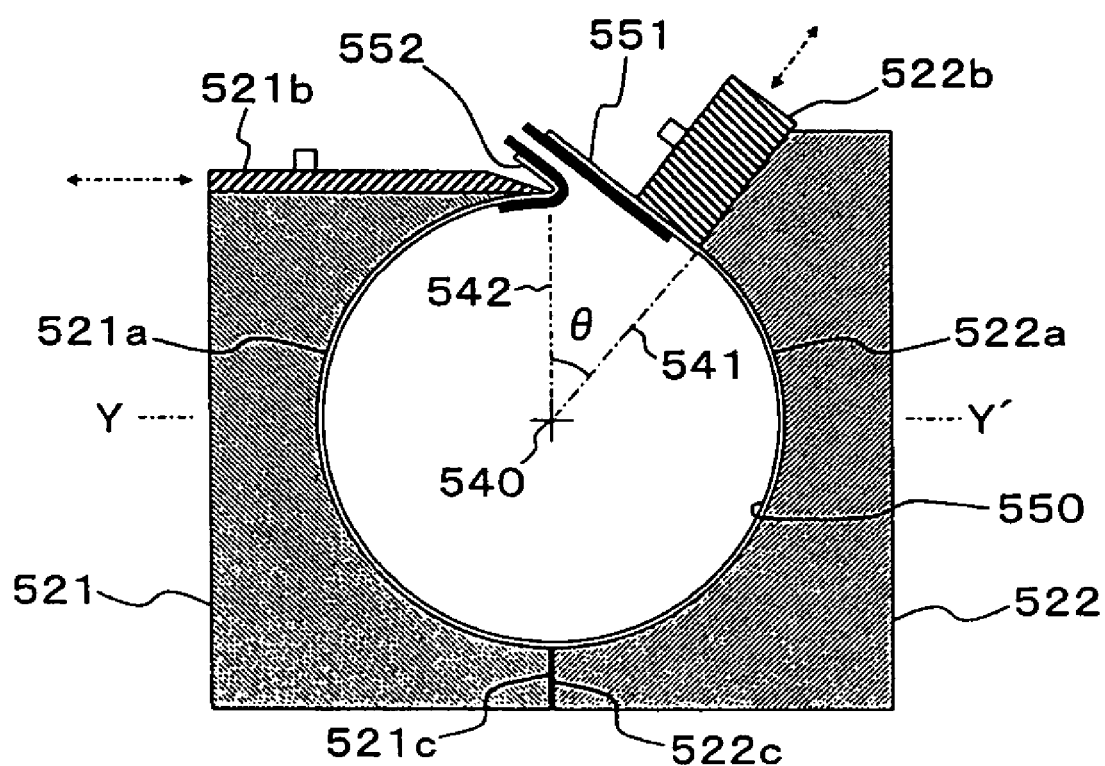
FIG. 12 is a cross-sectional view taken along line X–X' of FIG. 11 schematically illustrating the structure of an assembly chuck in a film cartridge assembling apparatus of the second embodiment of the present invention.
Figure 13:
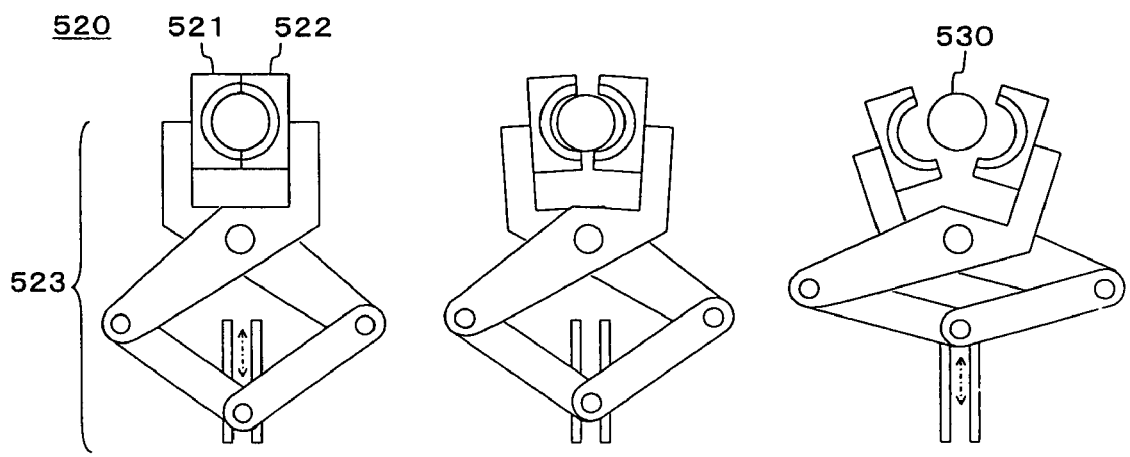
FIGS. 13A to 13C are front views, looking along the direction of arrow A in FIG. 11, schematically illustrating the operation of an assembly chuck in the film cartridge assembling apparatus of the second embodiment of the present invention.
Figure 14:
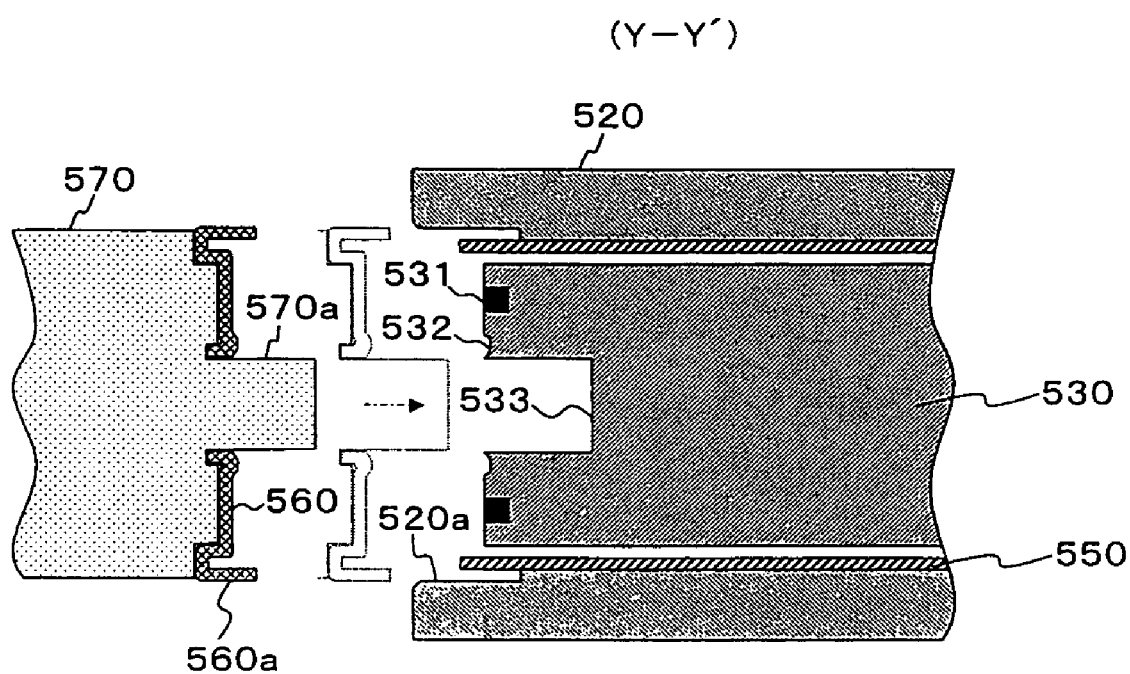
FIG. 14 is a cross-sectional view, taken along line Y–Y' of FIG. 12, for schematically showing the assembly chuck and the manner of inserting a cap onto a mandrel in the film cartridge assembling apparatus of the second embodiment of the present invention.
Figure 15:
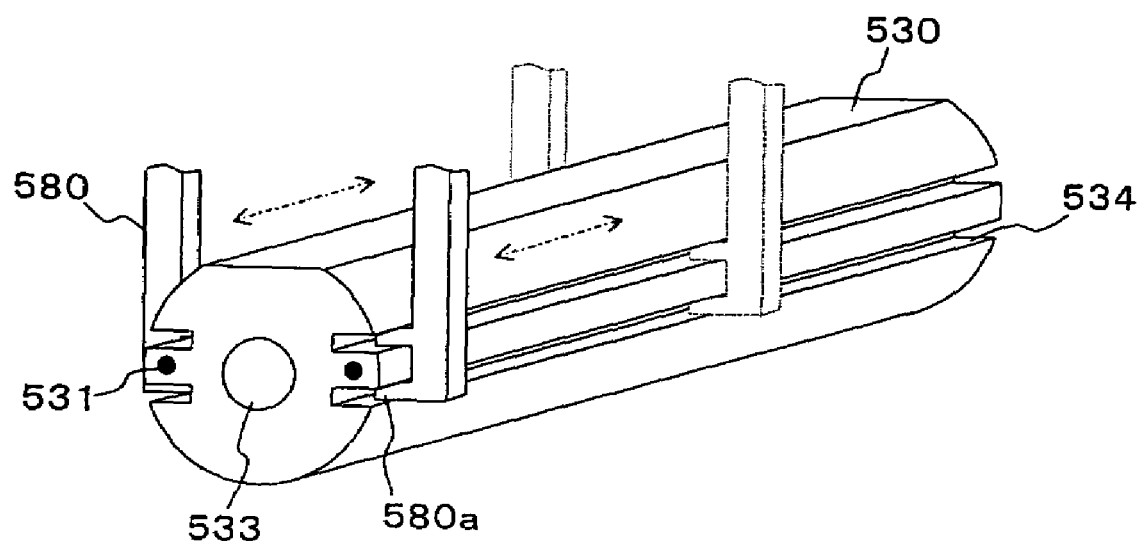
FIG. 15 is a perspective view schematically showing the structure of the mandrel and an ejection mechanism member in the film cartridge assembling apparatus of the second embodiment of the present invention.

Referring to the drawings, a film cartridge assembling apparatus according to a second embodiment of the present invention is now explained. FIG. 11 is a plan view schematically showing the structure of the film cartridge assembling apparatus according to the second embodiment of the present invention. FIG. 12 is a cross-sectional view, taken along line X–X' of FIG. 11, for schematically showing the structure of the assembly chuck in the film cartridge assembling apparatus according to the second embodiment of the present invention. FIG. 13 is a front view, looking along the direction of an arrow A of FIG. 11, schematically showing the operation of the assembly chuck in the film cartridge assembling apparatus according to the second embodiment of the present invention. FIG. 14 is a cross-sectional view, taken along line Y–Y' of FIG. 12, schematically showing the assembly chuck in a film cartridge assembling apparatus and the state of cap insertion onto the mandrel according to the second embodiment of the present invention. FIG. 15 is a perspective view for schematically showing the structure of the mandrel and the component of the discharging mechanism in the film cartridge assembling apparatus according to the second embodiment of the present invention. Meanwhile, the mandrel is not shown in FIG. 12 fir simplicity.

This film cartridge assembling apparatus includes an index unit 510, an assembly chuck 520 and a mandrel 530 (see FIG. 11).

Figure 16:
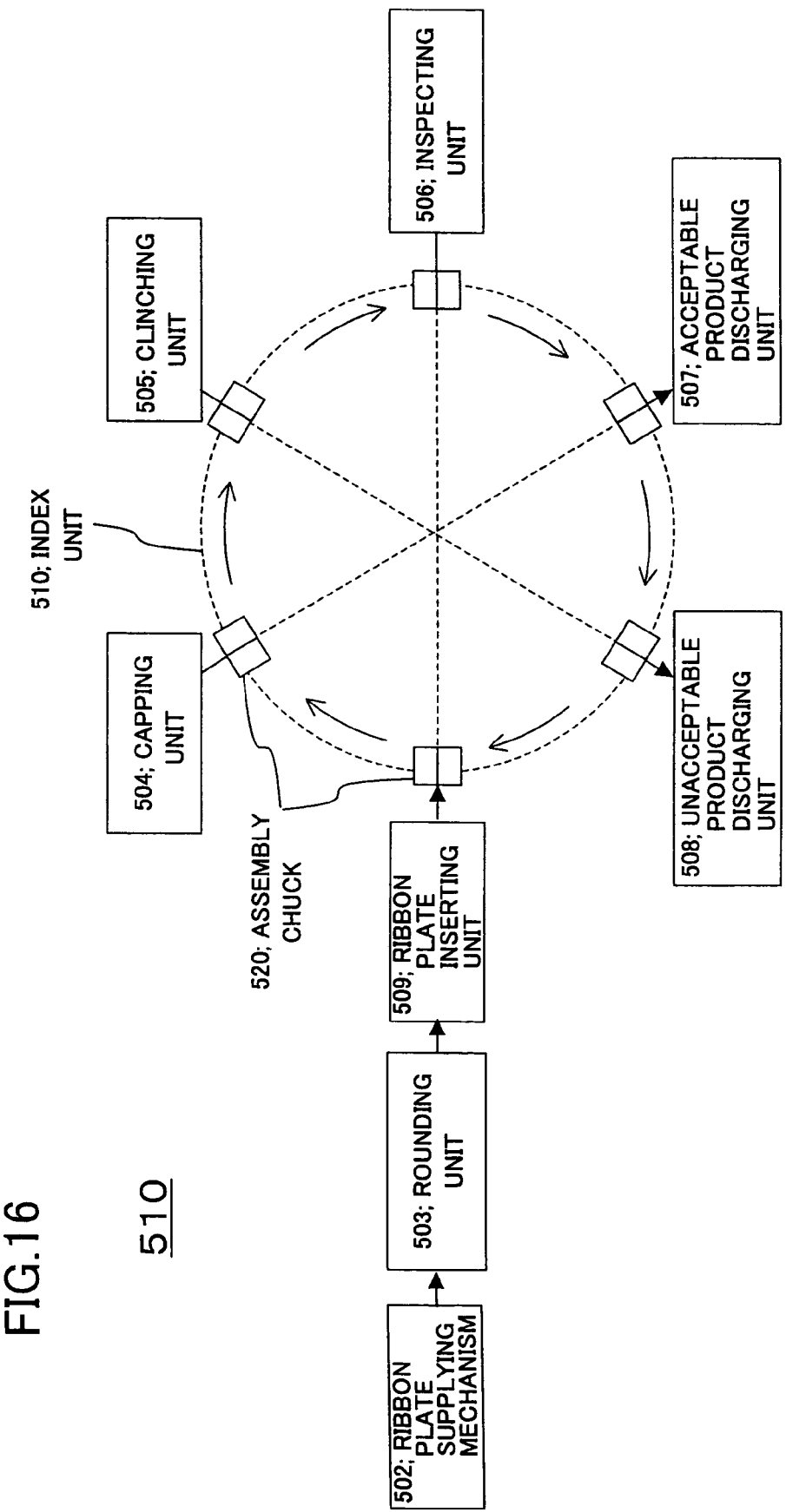
FIG. 16 is a block diagram schematically showing the structure of a film cartridge assembling apparatus of the second embodiment of the present invention.

The index unit 510 is a unit for transporting the ribbon plate to respective process step units (a ribbon plate inserting unit, a capping unit, a clinching unit, an acceptable product discharging unit, and a remnant discharging unit; see FIG. 16). The index unit 510 is adapted for being rotated about a shaft of rotation lying at right angles to a substantially horizontal plane. The index unit includes six supports 512 at equi-angular intervals, that is every 60°, about the shaft of rotation (see FIG. 11). The shaft of rotation 511 is coupled to a driving unit, not shown, adapted for intermittently rotating the index unit at an angular pitch equal to the aforementioned angular interval (see FIG. 11). One assembly chuck 520 is mounted to each support 512 for performing an opening/closure movement. The mandrel 530 is mounted between the respective assembly chucks 520 with its center axis extending substantially horizontally towards the shaft of rotation (see FIG. 11).

The assembly chuck 520 is a member for holding the cylindrically rounded ribbon plate and is formed to have a cylindrically-shaped inner surface with a portion of the circumference of the cylinder being cut-out and opened. The assembly chuck 520 includes a haze side chuck 521 and a straight side chuck 522 (see FIG. 12) and holds a haze part 552 of the ribbon plate so as to overlie the center axis 540 (on a plumb line of extension 542).

The haze side chuck 521 includes a cylindrically-shaped surface 521a, formed on its inner surface, for holding the cylindrical outer side of the portion of the ribbon plate extending from the haze part 552 of, the ribbon plate to its bottom, and an edge member 521b, having a distal end of the edge facing the straight side chuck 522, and which is adjustably combined with the cylindrically-shaped surface 521a(see FIG. 12). The haze part 552 of the ribbon plate is hooked to the edge member 521b (see FIG. 12). The edge member 521b is fixed in a horizontally adjustable optional position.

The straight side chuck 522 includes a cylindrically-shaped surface 522a, formed on its inner surface, for holding the cylindrical outer side of the portion of the ribbon plate extending from the straight part 551 to its bottom, and a retention member 552b, having a flat portion extending from an end of the cylindrically-shaped inner surface to the opening, and which is adjustably combined with the cylindrically-shaped surface 522a (see FIG. 12). The retention member 552b is constructed for extending from one end of the cylindrically-shaped surface 522a in a manner flush with the one end for retaining the outer surface of the straight part 551 (see FIG. 12). The retention member 552b is secured to the plate surface of the straight part 551 at an optional vertically adjustable position relative to the plate surface thereof (see FIG. 12).

In the closed state of the assembly chuck 520, the inner surfaces of the haze side chuck 521 and the straight side chuck 522 are matched to present a cylindrically-shaped inner surface, whereas, in the opened state of the assembly chuck 520, the ends 521c, 522c of the haze side chuck 521 and the straight side chuck 522 extending substantially parallel to the cylindrically-shaped surface of the assembly chuck are spaced away from each other (see FIG. 12). The opening/closure movements of the haze side chuck 521 and the straight side chuck 522 are by mechanical movements of an opening/closure mechanism 523 (see FIG. 13). The opening/closure mechanism 523 may be different from the illustrated configuration.

In a transverse cross-section in the closed state of the assembly chuck 520, an angle θ between a line 542 extending from the center axis 540 in the radial direction and a line 541 interconnecting a boundary line between the substantially cylindrical surface and the planar portion (surface abutting against the straight portion of the ribbon plate) of the straight side chuck and the center axis is approximately 35° in the second embodiment (see FIG. 12). Although the angle θ of 25 to 50° suffices, the angle is preferably 30 to 40°. With the angle θ of 30 to 40°, the pull-out torque is well-balanced with light shielding properties, thus preventing the yield from being lowered.

The assembly chuck 520 includes a step 520a on the inner peripheral surface of the chuck-side distal end of the mandrel 530 for enabling the insertion of an outer peripheral surface portion 560a of the cap into the end of the ribbon plate 550 (see FIG. 14).

The mandrel 530 is a member for holding the ribbon plate 550, in particular the one-capped cartridge having a cap clinched to its single side end, in stability, even in the opened state of the assembly chuck 520, and is arranged in a space delimited by the cylindrically-shaped inner surface of the assembly chuck 520. The mandrel 530 has an outer cylindrically-shaped outer surface smaller than the cylindrically-shaped surface of the assembly chuck (see FIG. 15).

A magnet 531 for holding a cap 560 by suction is mounted in the vicinity of the distal end face of the mandrel 530 (see FIG. 14). The distal end face of the mandrel 530 has a face 532 matched to the surface of the cap. By holding the cap 560 of the one-capped cartridge by the magnet 531, the one-capped cartridge may be held in stability without being popped out from the chuck, even when an indexing operation is carried out at a high speed. The distal end face of the mandrel 530 includes a recess 533 into which is inserted a convexed part 570a of the guide mandrel for cap insertion in the capping device, not shown, such that the cap 560 may be inserted in the centered state to the ribbon plate 550. The convexed part is adapted to be inserted into the opening in the cap. The capping device is used for inserting the cap to the single side end of the ribbon plate when the assembly chuck holding the ribbon plate in the cylindrically rounded state is halted at another halt position.

A horizontal guide groove 534 is formed in the cylindrically-shaped surface of the mandrel 530. In this guide groove is slid a pin 580a of a component of a discharging mechanism 580 (see FIG. 15). The component of a discharging mechanism 580 is a component for ejecting the ribbon plate or the one-capped cartridge comprised of the cap clinched to the single side end of the ribbon plate, held by the mandrel 530, when the assembly chucks 521, 522 are in the opened state (see FIG. 13C). The component of a discharging mechanism 580 is able to thrust the end of the ribbon plate by the distal end of the mandrel 530 to eject the ribbon plate or the one-capped cartridge from within the assembly chuck.

The operation of the film cartridge manufacturing apparatus of the second embodiment is now explained. FIG. 16 is a block diagram schematically showing the structure of the film cartridge manufacturing apparatus of the second embodiment of the present invention.

First, the boat-shaped ribbon plate 550 is supplied from a ribbon plate supply unit 502 to a rounding unit 503. In the rounding unit 503, the boat-shaped ribbon plate, supplied thereto, is rounded to a substantially cylindrical shape (see FIG. 16).

The rounded ribbon plate is transported from the rounding unit 503 through a ribbon plate introducing unit 509 to the assembly chuck 520 which is halted in the near-by position. The ribbon plate is introduced into the assembly chuck 520 which is in the opened state. The assembly chuck 520 then is closed to hold the ribbon plate 550 in the cylindrically rounded state (see FIGS. 12 and 16).

When the index unit 510 is rotated by one pitch and halted in a different halt position, a cap is inserted in the capping unit 504 to the single side end (the distal end side of the mandrel) of the rounded ribbon plate 550, held as described above (see FIGS. 14 and 16). At this time, the assembly chuck 520 does not perform an opening/closure movement.

Figure 17:
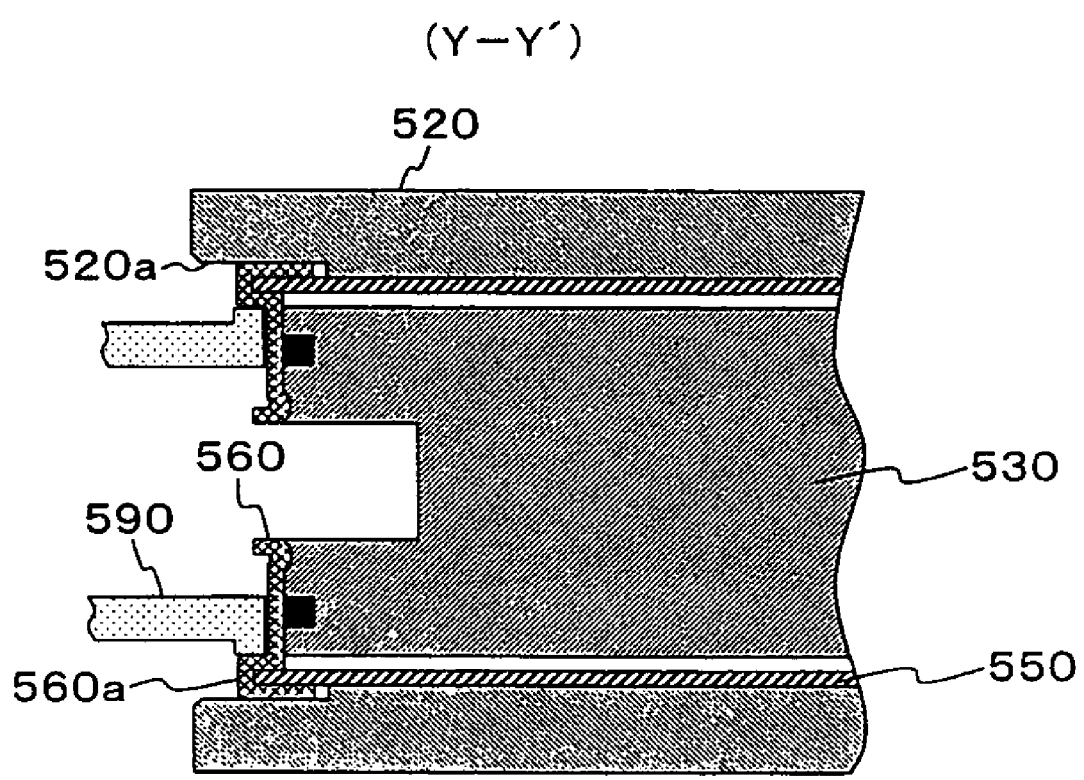
FIG. 17 is a cross-sectional view, taken along line Y–Y' of FIG. 12, schematically showing the assembly chuck and the manner of clinching a cap of a mandrel in the film cartridge assembling apparatus of the second embodiment of the present invention.
Figure 18:
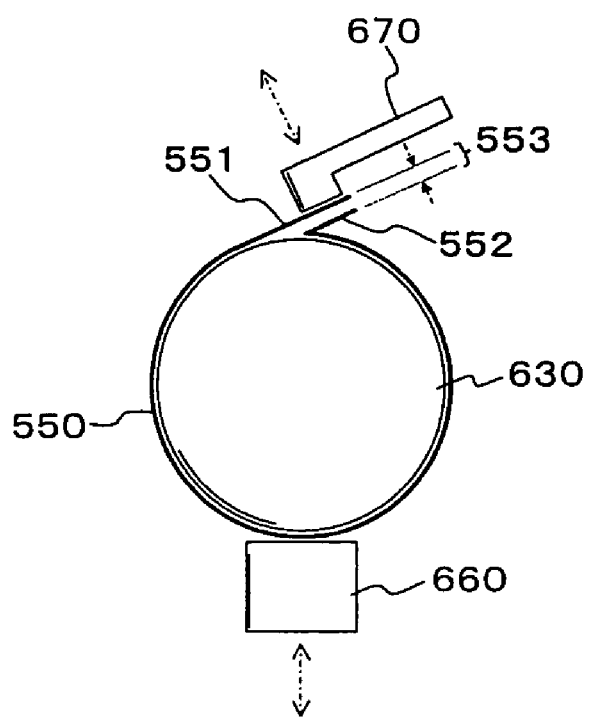
FIG. 18 is a front view schematically showing the structure of a typical conventional assembly chuck.

When the index unit 510 is rotated by one pitch and halted in a different halt position, a clinching claw 590 is thrust in a clinching unit 505 to the step 520a of the assembly chuck, from the inner surface of the outer rim 560a of the cap 560, inserted into the ribbon plate, thereby clinching the cap 560 to the ribbon plate 550, to form the one-capped cartridge (see FIGS. 16 and 17). At this time, the assembly chuck 520 again does not perform an opening/closure movement.

When the index unit 510 is rotated by one pitch and halted in a different halt position, the inspecting unit 506 monitors the engaged state between the cap of the produced one-capped cartridge and the ribbon plate to detect whether or not the one-capped cartridge is acceptable (see FIG. 16). At this time, the assembly chuck 520 again does not perform an opening/closure movement.

When the index unit 510 is rotated by one pitch and halted in a different halt position, the assembly chuck 520 is opened in the acceptable product discharging unit 507. Based on the results of detection by the inspecting unit 506, the one-capped cartridge, detected to be acceptable, is thrust by the component of a discharging mechanism 580 so as to be discharged to outside (see FIGS. 15 and 16). The one-capped cartridge, detected to be unacceptable, is not discharged.

When next the index unit 510 is rotated by one pitch and halted in a different halt position, the assembly chuck 520 is in the opened state. If there exists the unacceptable one-capped cartridge, the one-capped cartridges that were not discharged by the acceptable product discharging unit or remnants (such as single caps or single ribbon plates) 507 are thrust in the unacceptable product discharging unit 508 by the component of a discharging mechanism 580 so as to be discharged to outside (see FIGS. 15 and 16).

When the index unit 510 is rotated by one pitch and halted in a different halt position, the ribbon plate, rounded in the rounding unit 503, is inserted into the empty assembly chuck 520. The above-described sequence of operations is repeated (see FIG. 16). The operations in the respective process step units are carried out in parallel such that one one-capped cartridge is completed for each one-pitch partial rotation.

Figure 19:
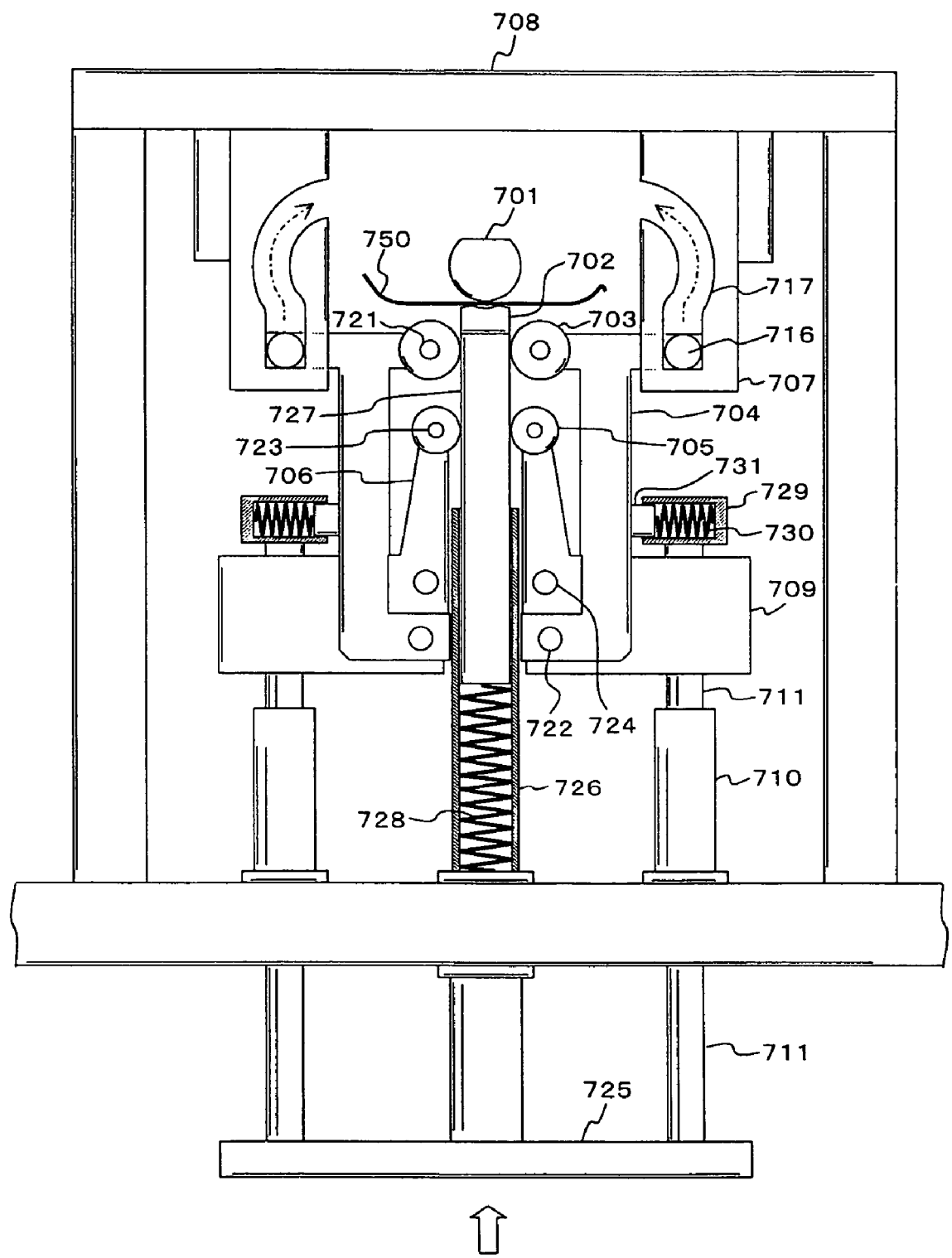
FIG. 19 is a partial side view schematically showing the structure of a film cartridge forming apparatus of a third embodiment of the present invention.
Figure 20:
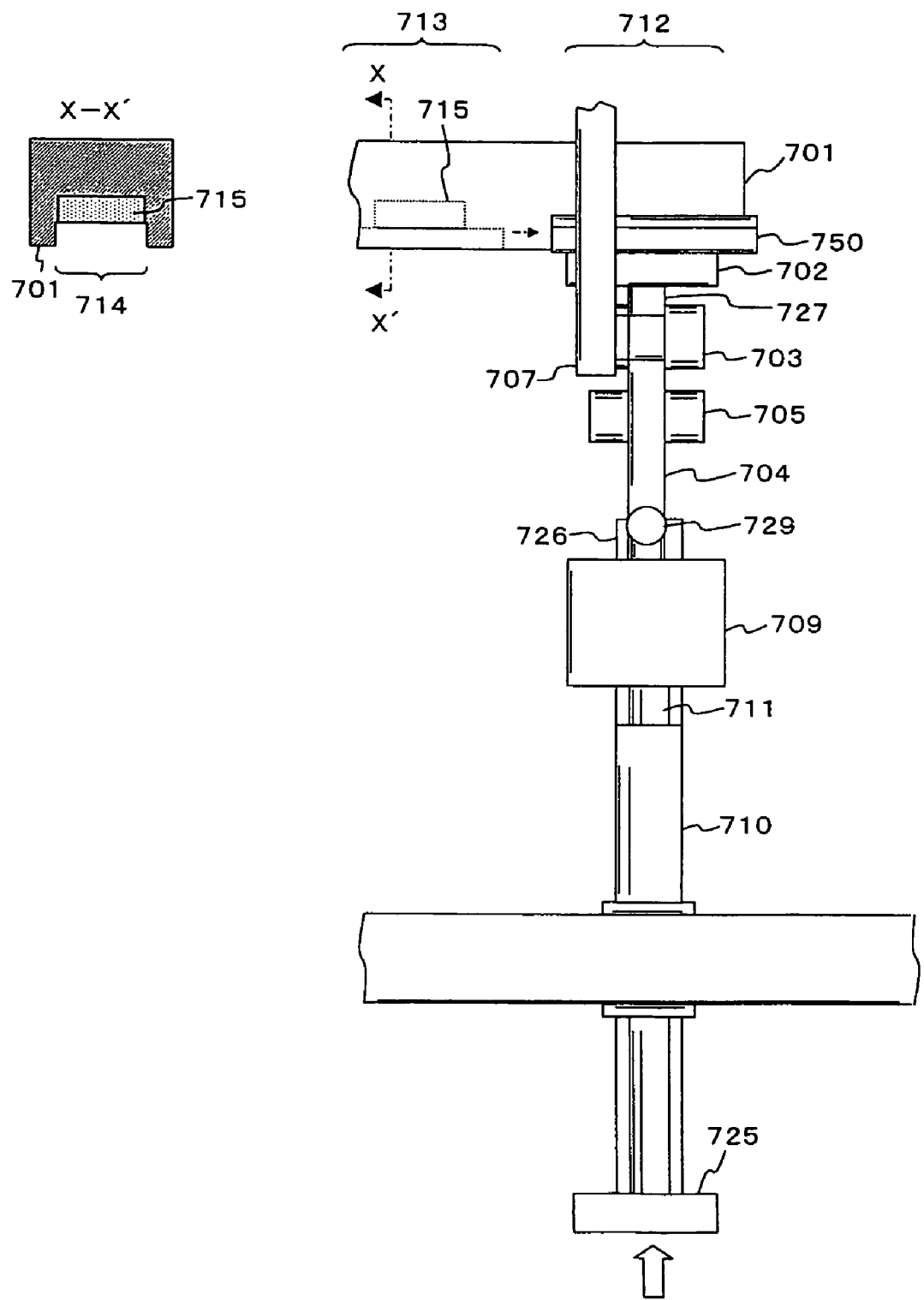
FIG. 20 is a partial front view schematically showing the structure of the film cartridge forming apparatus of the third embodiment of the present invention.

Referring to the drawings, a third embodiment of the present invention is explained in detail. FIG. 19 is a partial side view schematically showing the structure of the film cartridge forming apparatus of the third embodiment of the present invention, and FIG. 20 is a partial front view schematically showing the structure of he film cartridge forming apparatus of the third embodiment of the present invention. It is noted that an uplifting shaft 726 and a roller presser 729 of FIG. 19 are shown in cross-section, as in the other figures, and that a frame section 708 is not shown in FIG. 20.

Referring to FIG. 19, this film cartridge forming apparatus is designed for forming the boat-shaped ribbon plates, supplied one by one, to cylindrically-shaped ribbon plates, and includes a mandrel 701, a support metal 702, a rounding roller 703, a first arm 704, a presser roller 705, a second arm 706, a guide section 707, a frame section 708, a roller holder 709, a housing 710 and a shaft 711.

The mandrel 701 is a member having a cut-out in its upper surface and a cylindrically-shaped surface, and is arranged with its center axis horizontal (see FIG. 19). The portion of the mandrel 701 extending from a clamp section 712 with respect to a support metal 702, that is the ribbon plate supply side portion of the mandrel, is formed as a passage section 713 through which the boat-shaped ribbon plate 750 is transported by a carrier, not shown. It is noted that the surface of the boat-shaped ribbon plate, destined to be the inner surface when the ribbon plate is rounded, is to be directed to the mandrel 701. A recess 714 (bottomed groove) is formed in the bottom surface of the passage section 713, and a magnet 715 is mounted near the bottom of the recess 714 at a spacing from the bottom surface of the passage section 713, which bottom surface is to be understood as not including the inner lateral surface of the recess. This magnet 715 performs the role of attracting metal debris affixed to the boat-shaped ribbon plate 750.

The support metal 702 is a member for clamping the ribbon plate from its bottom side in cooperation with the mandrel 701, as the ribbon plate 750 is abutted against the mandrel 701, that is as the surface of the ribbon plate destined to be its inner surface, is directed to the mandrel 701 (see FIG. 19). When a roller holder 709 is uplifted by a cam, not shown, the support metal 702 is uplifted by an uplift shaft 726 and a spring 728, along with a support member 727, for clamping the ribbon plate by the force of the spring 728 in cooperation with the mandrel 701 (see FIG. 20). In the surface of the support metal 702, directed to the mandrel 701, there is formed a groove complementary to the curved surface of the mandrel 701 (see FIG. 19). The mandrel 701 and the support metal 702 are collectively termed a mandrel unit.

A rounding roller 703 is a roller for rounding the ribbon plate 750, clamped by the mandrel unit, as the rounding roller presses the ribbon plate, thus clamped, along the cylindrically-shaped surface section of the mandrel 701. A left side rounding roller and a right side rounding roller are arranged as a pair to form the rounding roller 703 and are mounted to the first arm 704 for rotation about a shaft 721 as the center of rotation.

A first arm 704 is a member for assisting in the operation of the rounding roller 703 through a predetermined range. Actually, a left side first arm and a right side first arm are arranged symmetrically and mounted to a roller holder 709 for performing an oscillatory movement about shafts 722 as center of oscillation. The portion of the first arm 704 towards the mandrel 701 carries the rounding roller 703 for rotation about a shaft 721 as the center of rotation. The back side of the first arm carries a cam follower 716 for performing a smooth sliding movement within a guide groove 717 of a guide section (see FIG. 19). On the back side of an intermediate trunk section of the first arm 704 (on the opposite side to the mandrel 701) is mounted a roller presser 729 for pressing the rounding roller 703 towards the mandrel 701, more precisely, for pressing the back side surface of the intermediate trunk section of the first arm 704 (see FIG. 19) The roller presser 729 is made up by a presser metal fixture 731 that may emerge from or be receded into an opening formed in a preset member mounted to the roller holder 709 and a spring 730 perpetually thrusting the presser metal fixture from its back side (see FIG. 19).

The presser roller 705 is a roller for pressing the cylindrical surface on each side of the clamp section for the ribbon plate 750 when the ribbon plate is rounded to a cylindrical shape. Actually, a left side presser roller and a right side presser roller are arranged in a pair between the left and right side first arms 704 and are mounted to the second arms 706 for rotation about shafts 723 as the center of rotation (see FIG. 19).

The second arms 706 assist in movement of the presser rollers 705 within a preset range and are arranged symmetrically on the left and right sides between the left and right first arms 704. The second arms 706 are mounted to the roller holders 709 for oscillation about the shafts 724 as the center of oscillation. The presser rollers 705 are mounted for rotation in the vicinity of the mandrel 701 for rotation about the shafts 723 as the center of rotation (see FIG. 19). The first arm 704 is contacted with the backside of the intermediate trunk section of the second arm 706 (the opposite side of the second arm to the mandrel 701) for pressing the presser roller 705 towards the mandrel 701, that is for pressing the back surface of the trunk portion of the second arm 706 (see FIG. 19).

The guide section 707 is a member for causing movement of the rounding roller 703 along each outer side of the support metal 702 and along the cylindrically-shaped surface section of the mandrel 701. Actually, a left side guide section and a right side guide section are arranged in a pair and are affixed to the frame section 708. The guide section 707 includes a guide groove 717 for guiding the operating direction of the cam follower 716 of the first arm (see FIG. 19).

The frame section 708 is a frame-shaped member secured to the main body unit for securing the guide section 707 (see FIG. 19).

In the roller holder 709, the first arms 704 are mounted for oscillation about the shafts 722 as the center of rotation, while the second arms 706 are mounted for oscillation about the shafts 724 as the center of rotation. Actually, left and right first arms and left and right second arms are arranged as pairs. The roller holder 709 performs up-and-down movement, via shafts 711, concomitantly with the up-and-down movement of the member 725 (see FIG. 19).

A housing 710 is a mechanical unit for holding a shaft 711, adapted for causing the up-and-down movement of the overlying roller holder 709, through actuation of a cam, not shown, and through the member 725. Actually, a left side housing and a right side housing are arranged as a pair (see FIG. 19).

The shaft 711 is a member for transmitting the up-and-down movement of the member 725 to the roller holder 709. Actually, a left side shaft and a right side shaft are arranged as a pair (see FIG. 19).

In the above-described embodiment, a pair of the presser rollers 705 and a pair of the rounding rollers 703 are used. Alternatively, a plural number or a plural number of pairs of the presser rollers or the rounding rollers may be used. The rollers may also be formed as one with the capping/clinching unit.

The operation of the film cartridge manufacturing apparatus of the third embodiment is now explained.

Referring first to FIGS. 19 and 20, a boat-shaped ribbon plate 750, with its surface, destined to be the inner surface of the film cartridge, directing towards the mandrel 701, is moved by a carrier, not shown, with the bottom side of the passage section 713 of the mandrel facing the clamp section 712, as indicated by an arrow. The metal debris that may be affixed to the ribbon plate 750 in the course of the movement is attracted by the magnet 715 and thereby removed.

The support metal 702 is opened on its bottom side and the boat-shaped ribbon plate 750 transported is inserted by the carrier, not shown, into a gap between the mandrel 701 and the support metal 702. This support metal 702 is then tightened to clamp the boat-shaped ribbon plate 750 between the mandrel 701 and the support metal 702 (see FIGS. 19 and 20).

Referring to FIG. 21A, the roller holder 709 is uplifted by the cam operation through shaft 711 to uplift the cam follower 716 of the first arm 704 along the guide groove 717 of the guide 707 (more precisely, along the plumb line portion thereof), while the rounding roller 703 is uplifted along each of the outer sides of the support metal 702. At this time, the roller surface of the rounding roller 703 compresses against the bottom surface of the boat-shaped ribbon plate 750.

Referring to FIG. 21B, the cam follower 716 of the first arm 704 is uplifted along the guide groove 717 of the guide 707 (more precisely, along the plumb line portion thereof). During this time, the rounding roller 703 is pressed against the ribbon plate 750 under the action of a presser exemplified by a spring. Thus, the rounding roller 703 is uplifted, as it bends the ribbon plate, until the distance between the center axis of the rounding roller 703 and the center axis of the mandrel 701 is equal to the sum of the radius of the rounding roller 703, the radius of the mandrel 701 and the thickness of the ribbon plate 750, that is until a surface portion of the ribbon plate 750 registering with the cylindrically-shaped surface of the mandrel 701 is formed.

Referring now to FIG. 21C, as the roller holder 709 is uplifted, the rounding roller 703 is moved along the cylindrically-shaped surface of the mandrel 701, with the rounding roller pressing the cylindrically-shaped surface of the mandrel 701 by the roller presser. In this manner, the ribbon plate 750 is rounded to a true circular shape. When the pressing roller 705 compresses against each of the lateral sides of the clamp section of the ribbon plate 750, the uplifting of the roller 703 ceases (see FIG. 22).

Figure 21:
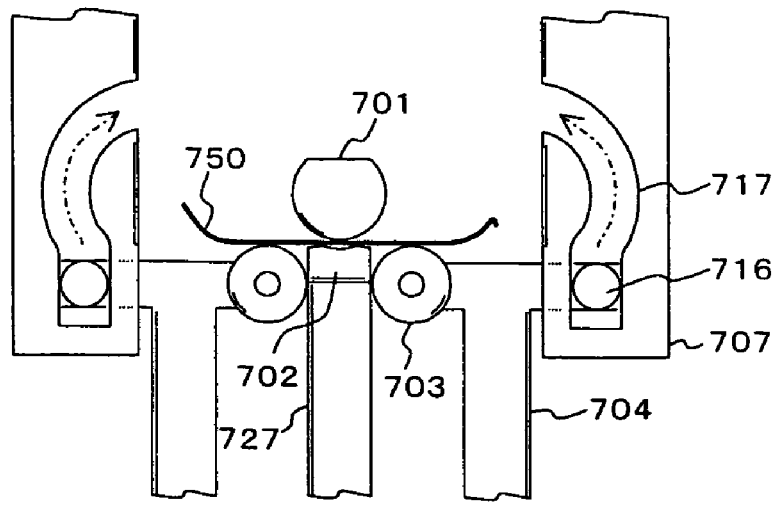
Figure 21:
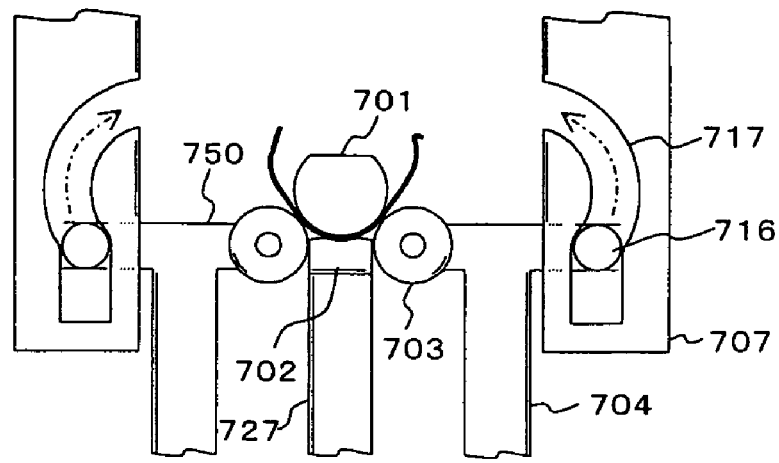
Figure 21:
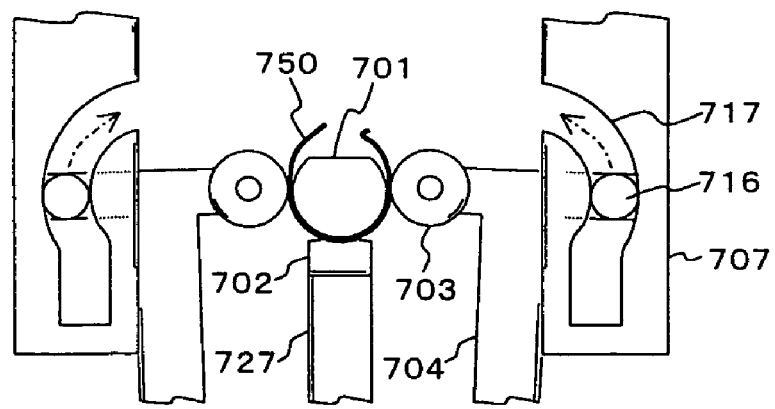

The trajectory of the rounding roller 703 from FIG. 21B to FIG. 21C at this time is such that, as the rounding roller 703 is uplifted, the left and right side rounding rollers 703 are separated away from each other along the cylindrically-shaped surface of the mandrel 701. On the other hand, the trajectory of the rounding roller 703 from FIG. 21C to FIG. 22 is such that, as the rounding roller 703 is uplifted, the left and right side rounding rollers 703 approach to the cylindrically-shaped surface of the mandrel 701.

Meanwhile, lacking the operation of the cam follower 716 of the first arm 704 or the guide groove 717 of the guide section 707, the rounding roller 703, moving at a fast speed, cannot follow up with roller pressing such that it tends to be displaced from the ribbon plate 750 to produce a gap (skipping), or otherwise the thrusting pressure against the ribbon plate 750 becomes unstable. In the present embodiment, the high-speed follow-up of the trajectory of the rounding roller 703 may be assured by the operation of the cam follower 716 of the first arm 704 or the guide groove 717 of the guide section 707, so that the above-mentioned problem is not raised.

Referring to FIG. 23, a haze part 751 and a straight part 752 of the ribbon plate are retained from both outer lateral sides of the ribbon plate by a retention pawl 740 before the rounding roller 703 and the presser roller 705 are lowered. Subsequently, the rounding roller 703 and the presser roller 705 are lowered by the camming operation of the member 725 to separate the rounding roller 703 and the retention roller 705 away from the ribbon plate 750. At this time, the haze part 751 and the straight part 752 are separated away from each other by the resiliency proper to metal material and are retained by the retention pawl 740, thus producing a slight gap between the mandrel 701 and the ribbon plate 750.

Finally, the ribbon plate 750, rounded around the mandrel 701, is fed out by a feed claw, not shown, from the mandrel 701, as the ribbon plate 750 remaining rounded is retained by the retention pawl 740. The ribbon plate, thus fed out, is transported to the next step, such as an assembly chuck.

The meritorious effects of the present invention are summarized as follows.

With the present invention (method and apparatus for manufacturing film cartridges), the respective process step units of ribbon plate rounding, cap insertion and cap clinching are carried out simultaneously, thus achieving the high speed operations.

With the present invention (method and apparatus for manufacturing film cartridges), the respective process steps of ribbon plate rounding, cap insertion and cap clinching are carried out at different sites, so that the indexing angles of the driving cams for the respective operations can be broader and a sudden operation can be smoothed and hence the impact can be lessened to elongate the useful life.

With the present invention (method and apparatus for manufacturing film cartridges), the tray is first tilted when transferring the boat-shaped ribbon plate from the tray to the stocker, so that no gap is produced between the ribbon plates to assure stabilized transferring operations. On the other hand, the lift cylinder of the transfer mechanism with a smaller stroke suffices, while the mechanism for tilting the holding means in the transfer mechanism is unnecessary, thus simplifying the mechanism.

Moreover, with the present invention (method and apparatus for manufacturing film cartridges), the ribbon plates can be transported or taken out in stability in the stocker.

Additionally, with the present invention (method and apparatus for supplying plate materials), the feed claw does not rub against the ribbon plate edge or the coating surface, in the course of the transport of the ribbon plates from the stocker, so that only little debris is produced.

In accordance with the present invention (film cartridge assembling apparatus), the entire outer peripheral surface of the ribbon plate including the straight portion and the cylindrical surface of the rounded ribbon plate is retained by the assembly chuck, and hence the one-capped cartridge can be assembled with the cylindrical surface of the rounded ribbon plate being close to the true circle even under high speed operating conditions. As a result, film grazing due to a non-optimum surface shape is scarcely produced.

Moreover, in accordance with the present invention (film cartridge assembling apparatus), the angle between the line interconnecting the center axis of the assembly chuck and the distal end of the edge member and the line interconnecting the boundary line between the cylindrically-shaped inner surface and the flat surface and the center axis, in the transverse cross-sectional surface in the closed state of the assembly chuck, is constant, thus assuring facilitated setting of the port width. As a result, the port may be of a constant width to decrease the occurrences of non-optimum light shielding properties.

In addition, in accordance with the present invention (film cartridge assembling apparatus), it is possible to prevent port width deviations to eliminate time loss otherwise caused by adjustment, thus assuring stable holding even under high speed operating conditions.

In accordance with the present invention (film cartridge forming apparatus), the track of the rounding rollers are guided by the guide section (guide mechanism), so that the rounding rollers move stably, formation of polygonal shape of the ribbon plate is prevented and the stable rounding of the ribbon plate under high speed operating conditions can be carried out.

Moreover, in accordance with the present invention (film cartridge forming apparatus), because the ribbon plate rounded by the rounding roller is pressed by the presser roller, the intra-stress of the ribbon plate becomes constant, the cross-sectional shape of ribbon plate is nearly perfect circle and the quality of the ribbon plate improves without graze on the surface of the ribbon plate.

Further, in accordance with the present invention (film cartridge forming apparatus), unnecessary movement of the first arm is prevented by the guide section (guide mechanism), so that the maintenance of the apparatus is improved and the period of maintenance can be elongated.

In accordance with the present invention (film cartridge forming apparatus), metal debris attached on the surface of the ribbon plate are absorbed by the magnet internally mounted to the passage section of the ribbon plate before rounding, so that the photographic film accommodated therein is protected from the grazing even after producing the film cartridge.

It should be noted that other objects, features and aspects of the present invention will become apparent in the entire disclosure and that modifications may be done without departing the gist and scope of the present invention as disclosed herein and claimed as appended herewith.

Also it should be noted that, any combination of the disclosed and/or claimed elements, matters and/or items may fall under the modifications aforementioned.

What is claimed is:

1. A film cartridge assembling apparatus for assembling a film cartridge, made up by a ribbon plate holding a photographic roll film therein, and by a cap, said apparatus comprising
    one or more assembly chucks each including two die elements formed by combining partial cylindrical inner surfaces thereof together, the circumference of a resulting cylinder being partially cut to form an opening;
    one of said die elements including a member having a flat surface extending from an end of the cylindrically-shaped inner surface towards said opening, said member being adjustably mounted to said one of the die elements;
    said assembly chuck being able to assume a closed state in which the two inner surfaces of said two die elements are matched to each other to form a cylindrical inner surface and an opened state in which ends of said two die elements substantially parallel to the center axis of the cylindrical inner surface are spaced apart from each other.

2. The film cartridge assembling apparatus as defined in claim 1 wherein the other of said die elements includes an edge member having an edge end facing the one of said die elements, said edge member being adjustably combined with the end of the cylindrical inner surface of said other die element.

3. The film cartridge assembling apparatus as defined in claim 1 further comprising a mandrel arranged in a space delimited by the cylindrical inner surface of said assembly chuck, said mandrel having a cylindrical outer surface smaller than said cylindrical inner surface.

4. The film cartridge assembling apparatus as defined in claim 3 further comprising a magnet internally mounted in the vicinity of a distal end face of said mandrel.

5. The film cartridge assembling apparatus as defined in claim 3 further comprising a discharging mechanism for discharging a ribbon plate or a one-capped cartridge, held by said mandrel, when said die elements are opened apart from each other, said one-capped cartridge being made up by a ribbon plate and a cap clinched to a single side end of said ribbon plate.

6. The film cartridge assembling apparatus as defined in claim 5 wherein said discharging mechanism includes
    one or more guide grooves formed in a horizontal direction in a cylindrical surface of said mandrel; and
    a component of the discharging mechanism having a pin slidable in said guide groove, said component of the discharging mechanism thrusting an end of said ribbon plate for discharging the ribbon plate by a distal end of said mandrel.

7. The film cartridge assembling apparatus as defined in claim 1 further comprising:
    an index unit rotatable about a rotation axis as center and adapted for holding said assembly chucks at an equiangular interval about said rotation axis; and
    a driving unit for intermittently rotating said index unit at an angular pitch equal to said angular interval.

8. The film cartridge assembling apparatus as defined in claim 7 wherein said index unit is arranged with its rotation axis mounted at right angles to a substantially horizontal surface and is held such that a long axis of the assembly chuck is substantially horizontal and is oriented towards said rotation axis.

9. A film cartridge assembling apparatus for assembling a film cartridge made up by a ribbon plate holding a photographic roll film therein, and a cap, said apparatus comprising:

one or more assembly chucks each including two die elements formed by combining partial cylindrical inner surfaces thereof together, the circumference of a resulting cylinder being partially cut to form an opening;

one of said die elements including a member having a flat surface extending from an end of the cylindrically-shaped inner surface, said member being adjustably mounted to said one die element;

the other of said die elements including an edge member having an edge end facing said one die element, said edge member being adjustably combined with the end of the cylindrical inner surface of said other die element;

said two die elements being able to assume a closed state in which the two inner surfaces of said two die elements are matched to each other to form a cylindrical inner surface and an opened state in which ends of said two die elements substantially parallel to the center axis of the cylindrical inner surface are spaced apart from each other;

an angle between a line interconnecting said center axis and the edge end and a line interconnecting a boundary line between the cylindrical inner surface and said flat surface and the center axis in a transverse cross-section in said closed state is not less than 25° and not larger than 50°.

10. The film cartridge assembling apparatus as defined in claim 9 wherein the angle between a line interconnecting said center axis and the edge end and a line interconnecting a boundary line between the cylindrical inner surface and said flat surface and the center axis in the transverse cross-section in said closed state is not less than 30° and not larger than 40°.

* * * * *